April 23, 1968     R. A. FRASCA     3,378,938
AVIATION TRAINER

Filed Aug. 2, 1965     7 Sheets-Sheet 1

*INVENTOR.*
RUDOLF A. FRASCA
BY
Dominik & Stein
ATTORNEYS

INVENTOR.
RUDOLF A. FRASCA

April 23, 1968 R. A. FRASCA 3,378,938
AVIATION TRAINER
Filed Aug. 2, 1965 7 Sheets-Sheet 4
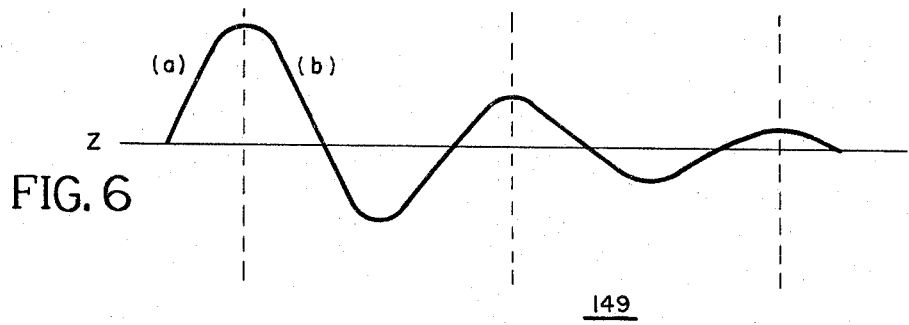
FIG. 6
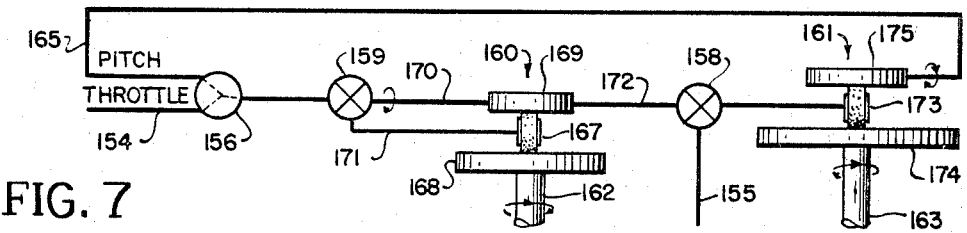
FIG. 7
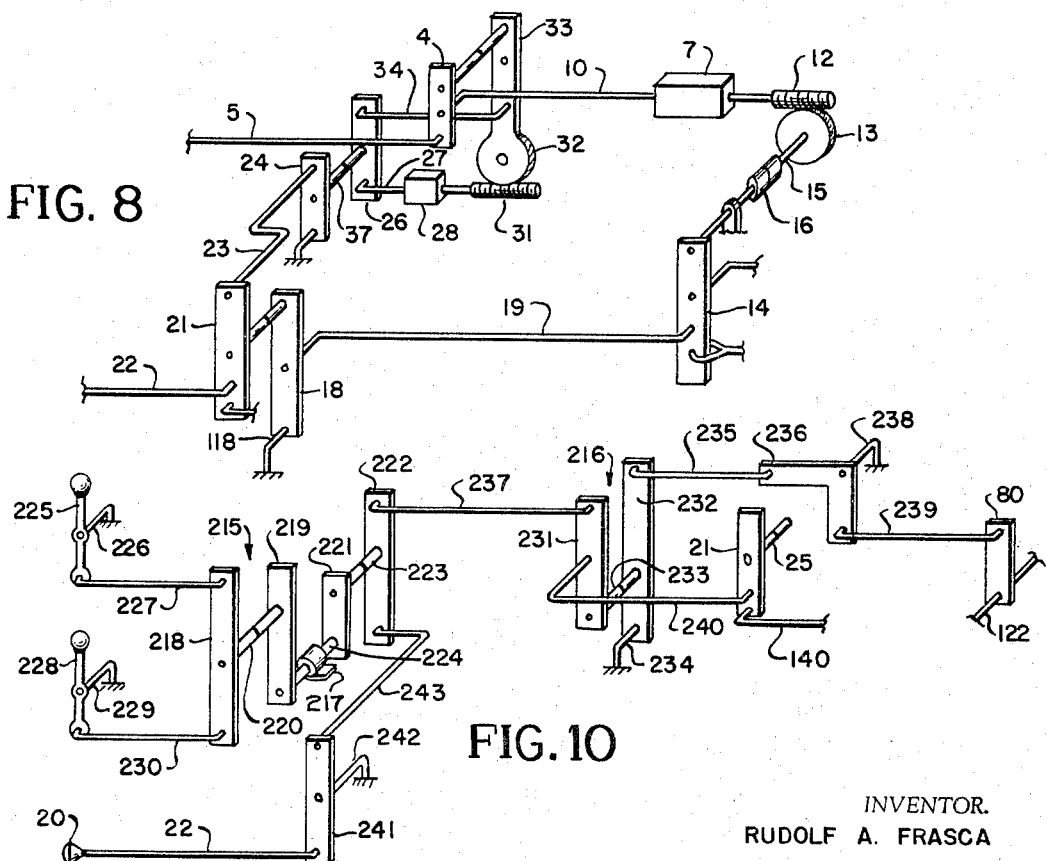
FIG. 8
FIG. 10
INVENTOR.
RUDOLF A. FRASCA
BY Dominik and Stein
ATTORNEYS

INVENTOR.
RUDOLF A. FRASCA
BY
ATTORNEYS

April 23, 1968 R. A. FRASCA 3,378,938
AVIATION TRAINER
Filed Aug. 2, 1965 7 Sheets-Sheet 6

INVENTOR.
RUDOLF A. FRASCA
BY
Dominik and Stein
ATTORNEYS

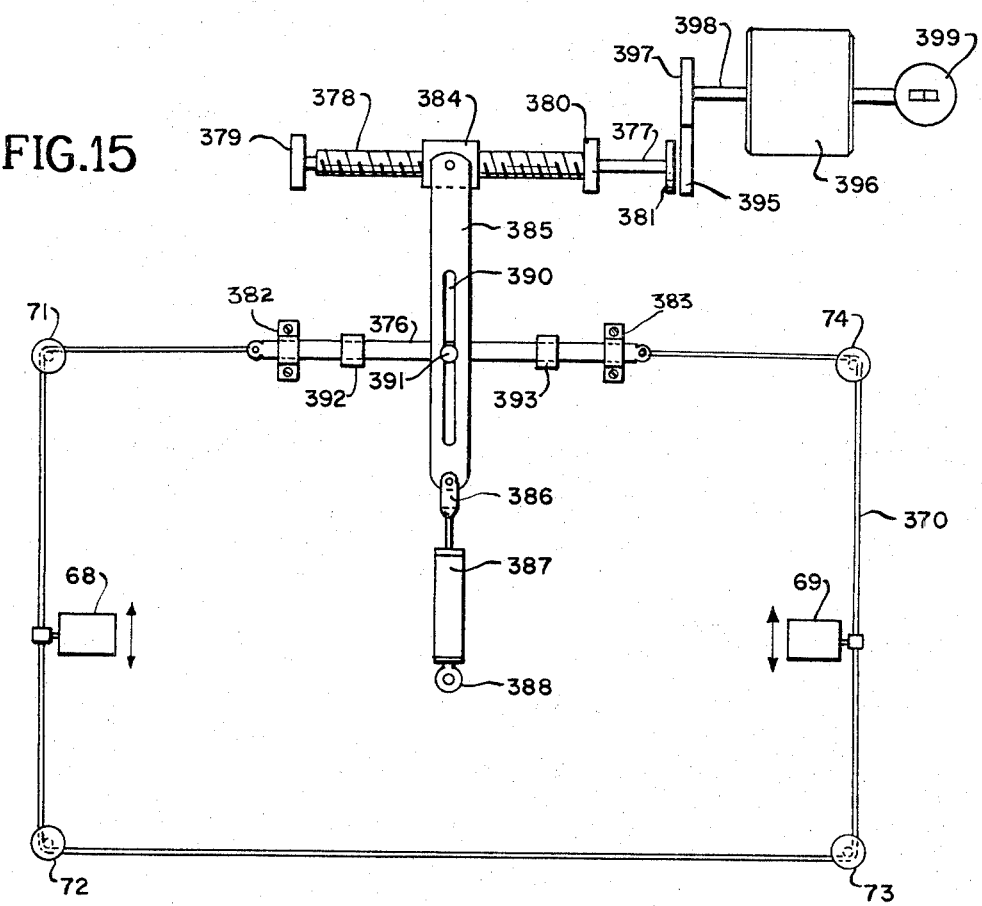
FIG. 15
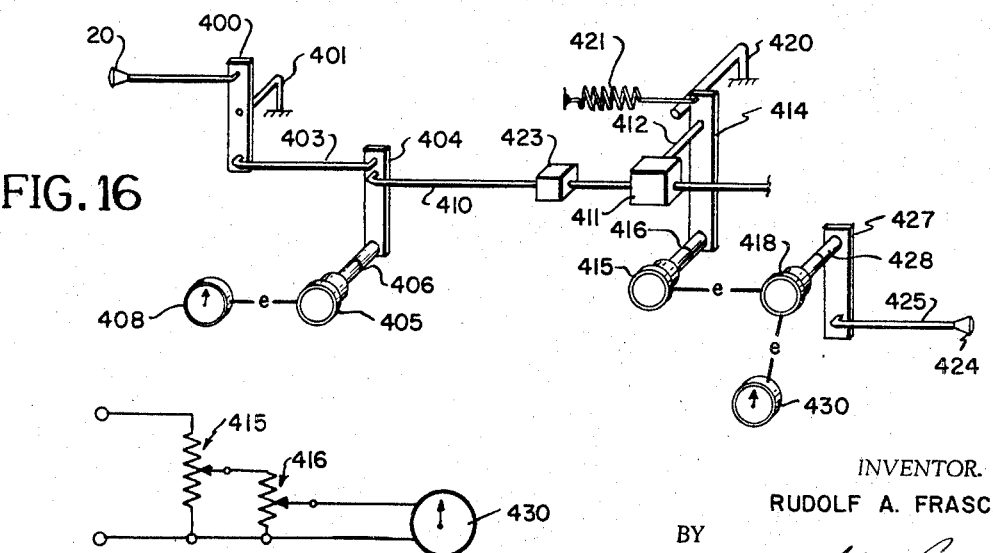
FIG. 16
FIG. 17
INVENTOR.
RUDOLF A. FRASCA
BY
*Dominik & Stein*
ATTORNEYS ary, 3,378,938
AVIATION TRAINER
Rudolf A. Frasca, 606 Neil St., Champaign, Ill. 61820
Continuation-in-part of application Ser. No. 320,976,
Nov. 4, 1963. This application Aug. 2, 1965, Ser.
No. 476,249
20 Claims. (Cl. 35—12)

This application is a continuation-in-part of co-pending application Ser. No. 320,976 filed Nov. 4, 1963, now abandoned, by Rudolf A. Frasca, entitled, "Aviation Trainer."

In the above mentioned co-pending application, an aviation trainer is disclosed which is primarily mechanically operated and essentially constitutes a miniature airplane which simulates flight conditions by displacing appropriate reading on instruments in the cockpit of the trainer. During operation, the trainer sits immovable upon a solid surface and simulates flight conditions solely by reference to the instruments on the instrument panel.

The aviation trainer of the aforesaid co-pending application includes apparatus which is designed to reflect the basic flight characteristics of an aircraft, including the inherent stability of an aircraft to recover and straighten out on a pre-established level flight attitude when the stick is positioned to momentarily position the elevator at a climb or dive attitude. In general, the disclosed aviation trainer reflects the basic flight characteristics of an aircraft.

The present invention is an improvement of the aviation trainer disclosed in the aforesaid co-pending application, in that the aviation trainer of the present invention is far more sophisticated, in that many more of the actual flight characteristics of an aircraft are more realistically simulated.

It is therefore an object of the present invention to provide an improved aviation trainer for simulating the actual flight characteristics of an aircraft, as realistically as possible.

It is a further object of this invention to provide a trainer which incorporates a mechanical computer which operates to provide readings on the instruments in the cockpit on the instrument panel which are responsive to movements of a control stick, throttle, and rudder pedals, and to properly correlate such readings.

It is a still further object of this invention to provide an aviation trainer which relies primarily upon mechanical linkages and thus is highly reliable, resistant to damage and virtually maintenance free.

It is a still further object of this invention to provide an aircraft trainer capable of simulating flight conditions which is easily transportable and can be readily moved about without elaborate preparations or installation problems.

Other objects of the invention will in part be obvious and will in part appear hereinafter.

The invention accordingly comprises the features of construction, combination of elements, arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings; in which:

FIGURE 6 is a graph illustrating the inherent oscillatory motion of an aircraft during recovery;

FIGURE 7 is a block diagram schematic of the phugoid oscillation generator of the trainer of the present invention;

FIGURE 8 is a view illustrating the components of the trainer of FIG. 2 corresponding to the phugoid oscillation generator of FIG. 7;

FIGURE 10 is a view illustrating the modifications to be made to the trainer of FIG. 2 to simulate airspeed drop with bank, and landing gear and flaps;

FIGURE 15 is a view illustrating a rudder centering and trim system exemplary of the present invention;

FIGURE 16 is a view illustrating a manifold pressure control system adaptable to the trainer of FIG. 2;

FIGURE 17 is a schematic diagram of the electrical portion of the system of FIG. 16.

Similar reference characters refer to similar parts throughout the several views of the drawings.

Figure 1:
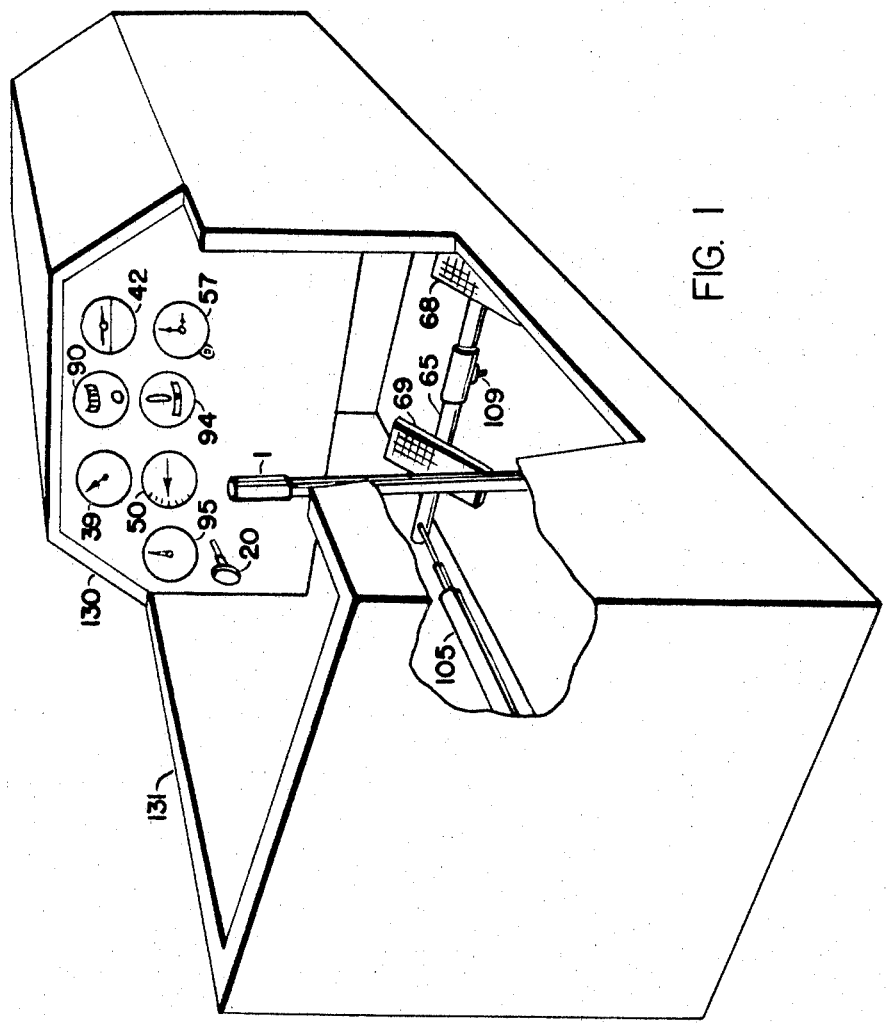
FIGURE 1 illustrates generally an aircraft trainer shown in a perspective view.

Referring now to the drawings, in FIGURE 1 a stationary aviation trainer 130 is shown incorporating a fuselage 131, a control stick 1, rudder pedals 68 and 69 and a throttle 20. Mounted on the instrument panel of the trainer shown in FIGURE 1 are an airspeed indicator 39, directional gyro 90, artificial horizon 42, rate of climb indicator 50, turn and bank indicator 94, altimeter 57, and a tachometer 95. The rudder pedals 68 and 69 are mounted on a rudder bar 65 which is rotatably mounted on pin 109. A spring loaded cylinder 105 is connected to each end of the rudder bar 65, but for purposes of clarity only the cylinder connected to one end of the rudder bar 65 is shown. It can be seen further in FIGURE 1 that space is provided for seating the pilot trainee in a position where he can readily operate the various controls. The trainer is designed so that a hood can be placed over the cockpit of the trainer to eliminate any distractions for the trainee allowing him to concentrate his attention on the instruments and controls.

Figure 2:
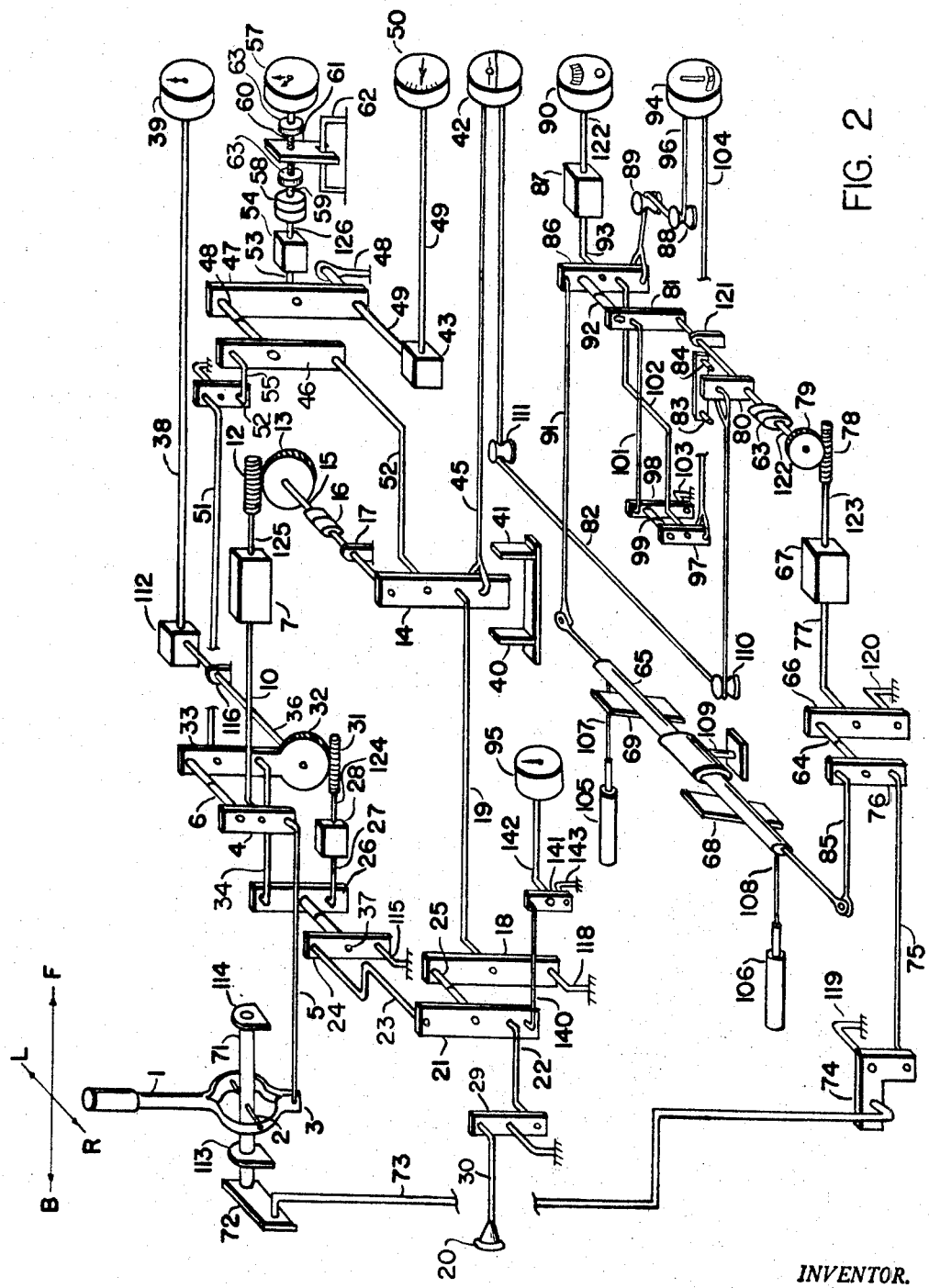
FIGURE 2 is a schematic representation of the controls used in the trailer with linkages and operating members shown connecting the controls of the instruments.

In FIGURE 2 there is shown a diagrammatic representation of the various flight controls, the instrument panel instruments and the various connections and linkages therebetween, of the aviation trainer disclosed in the above mentioned co-pending application. In this trainer, a control stick 1 is pivotally mounted by means of pin 2 on rod 71. Rod 71 in turn is journalled in bearings 113 and 114. Connected to the lower end 3 of the control stick 1 is connecting link 5 which ats its other end is connected to lever bar 4. Lever bar 4 is connected to lever bar 33 by means of connector 6. At the lower end of lever bar 33 is a gear wheel 32 which is fixedly attached to lever bar 33. A connecting rod 36 extends from the gear wheel 32 through a bearing 116 into a gear box 112 and from the gear box 112 connection is made by means of a connecting rod 38 to the airspeed indicator 39.

The throttle 20 is connected to a lever 29 by means of connecting rod 30, and lever 29 is connected to lever bar 21 by means of a connecting rod 22. Lever bar 21 is pivoted on a connector 25 which extends to lever 18. Lever bar 18 is connected by connecting rod 19 to lever bar 14. Lever bar 21 is further connected by connecting rod 23 to lever bar 24 which is pivotally connected to an anchor 115 and connected by connecting rod 37 to lever bar 26. Lever bar 26 is connected to lever bar 33 by connecting rod 34. Connecting rod 27 extends from lever bar 26 to a ball disc integrator 28. Extending from the ball disc integrator is shaft 124 upon which is mounted a worm gear 31 which engages wheel gear 32.

Extending from lever arm 4 is a connecting rod 10 which connects an additional ball disc integrator 7 to lever bar 4. Extending from the ball disc integrator 7 is a shaft 125 on which is mounted a worm gear 12 which engages a wheel gear 13.

Wheel gear 13 is mounted upon shaft 15, the shaft 15 being connected to lever bar 14, being journalled in bearing 17 and further mounting a slip-clutch 16. Lever bar 14 is connected to the lever bar 18 by means of a connecting rod 19. Lever arm 141 is connected to lever arm 21 by means of connecting rod 140. The lever arm 141 is further connected through connecting rod 142 to the tachometer 95. Stop members 40 and 41 are mounted below lever arm 14 and restrain lateral movement of the lower end of lever bar 14.

Lever bar 33 is connected to altimeter 57 by means of connecting rod 51, lever bar 52, connecting rod 55, lever arm 46, connector 48, lever arm 47, connecting rod 53, ball disc integrator 54, connecting rod 126, slip clutch 58, shaft 59, which incorporates threads 60 and upon which is threaded stop member 61. Stop member 61 is guided by track 62. A pair of stop members 56 are provided on shaft 59.

Connected to lever arm 47 by means of shaft 49 through gear box 43 is the rate of climb indicator 50.

The pitch portion of the artificial horizon 42 is connected to the lever bar 14 by means of cable 45 and the bank portion of the artificial horizon is connected by means of cable 82 which runs through pulleys 110 and 111, to lever arm 80.

The directional gyro 90 is connected to lever arm 86 by means of connecting link 93 through a ball disc integrator 87 and shaft 122.

The turn needle of turn and bank indicator 94 is connected by means of cable 96 to lever arm 86. Cable 96 runs through pulleys 88 and 89. The ball of the turn and bank indicator 94 is connected by cable 104 to lever arm 97.

The aileron lever arm 72 is fixedly mounted on control rod 71. Connecting the aileron lever arm 72 to lever arm 74 is connecting rod 73. Lever arm 74 is pivotally mounted upon support 119. Extending from lever arm 74 to lever arm 76 is connecting rod 75. Lever arm 76 is connected to lever arm 66 by connector 64. Also connected to lever arm 76 is a rudder control connector 85 which is hingedly connected to rudder bar 65. The rudder bar 65 is pivotally mounted on pin 109. Also hingedly connected to rudder bar 65 is connecting rod 91 which is in turn connected to lever arm 86, and in turn connected to directional gyro 90. Mounted on the rudder bar 65 are rudder pedals 68 and 69. Connected to either end of the rudder bar are rudder centering devices 105 and 106, these devices being respectively connected by connecting cable 107 and 108. Lever arm 66 is connected to lever bar 76 through connector 64, and also pivotally mounted on pin 120. Lever arm 66 is further connected by connecting rod 77 to ball disc integrator 67 which in turn is connected to worm gear 78 by means of shaft 123. Wheel gear 79 engages worm gear 78 and is fixedly attached to shaft 122. A slip clutch 63 on the shaft 122 connects the shaft to lever arm 80. Stop pins 83 and 84 are mounted on either side of the upper end of the lever arm 80 and restricts its lateral movement. A cable 82 extends from lever arm 80 to the bank portion of artifical horizon 42. The shaft 122 is further journalled in bearing 121 and is connected to lever arm 81. Connecting rod 101 connects lever arm 81 to lever arm 98. A connector 99 connects lever arm 93 to lever arm 97. Lever arm 98 is pivotally mounted on pin 103. Cable 104 extends from lever arm 97 to the ball of the turn and bank indicator 94.

Figure 3:
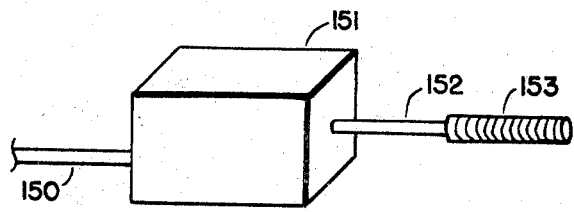
FIGURE 3 is a schematic representation of a typical integrator unit.

Referring now to FIGURE 3 there will be seen a general view in perspective of a typical ball disc integrator unit, comprising an input shaft 150, a casing 151, an output shaft 152 which mounts a worm gear 153.

Figure 4:
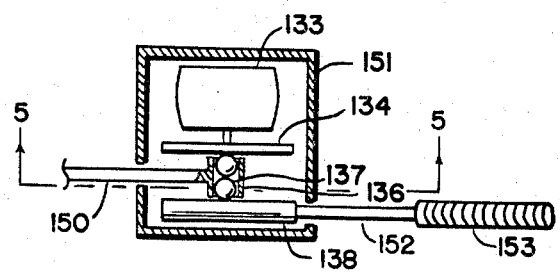
FIGURE 4 is a top plan view with the top removed of a typical integrator unit.

Referring to FIGURE 4, which is a top plan view of the ball disc integrator unit with the top removed for clarity, it will be seen that it incorporates a constant speed motor 133 which drives a disc 134. A carrier 136 carries two steel balls 137 which are frictionally engaged between disc 134 and roller 138. Connected to roller 138 by shaft 152, is worm gear 153. Shafts 150 and 152 are journalled in the openings in the case 151.

Figure 5:
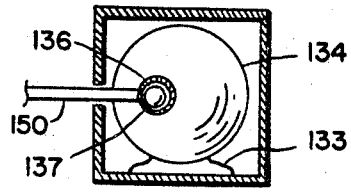
FIGURE 5 is a front elevation view taken along line 5—5 of FIGURE 4.

FIGURE 5 is a front cross sectional view taken along lines 5—5 of FIGURE 4. There is shown the disc 134, the carrier 136 mounted on shaft 150 and the ball 137.

The operation of the ball disc integrators is well known in the art and may be explained as follows. As shown in FIGURE 4, a slight displacement of the shaft 150 results in the movement of the ball 137 which is in contact with the disc 134. As long as the ball 137 is centered in the exact center of the rotating disc 134, no movement or motion is transmitted to the ball 137 by the rotating disc 134. As soon as the ball 137 is moved off the center of the disc 134, then the rotating disc 134 causes the ball 137 to begin rotating which in turn causes the other ball 137 which frictionally engages it to rotate also. This latter ball 137 is further frictionally engaged by roller 138, and the roller 138 begins to rotate causing the shaft 152 and worm gear 153 to rotate. When the feed back from the various linkages causes the ball 137 to again be centered on the rotating disc 134, then the movement between the ball 137 and roller 138 ceases and there is no further rotation in worm gear 153. This results from the frictional engagement of disc 134, balls 137 and roller 138 which are spring loaded to frictionally engage each other. For purposes of clarity the spring loading is not shown. As previously mentioned, the disc 134 is driven at a constant rotating speed by a constant speed motor 133.

Referring again to FIGURE 2 it will be seen that the movement of control stick 1 results in a changing in the reading on various instruments by means of mechanical connections. For reference purposes directions have been indicated above the control stick 1 representing movements of the stick in four different directions in which L stands for left movement, R for right movement, F for forward movement and B for backward movement.

If the control stick of an aircraft is moved forward, it is expected that the aircraft will assume a nose down, or diving, attitude and that the airspeed of the aircraft will increase. Also, the altimeter, the rate of climb and the artificial horizon indicator will likewise indicate the change in the aircraft's attitude. These changes are simulated and indicated on the trainer's instrument as described below. In moving the control stick 1 forward, the control stick is pivoted on pin 2 resulting in backward movement of the lower end of the control stick 3. The connecting rod 5 and lever arm 4 move backward and at the same time lever arm 4 rotates in a clockwise direction about the connecting shaft 6. This movement of lever 4 results in backward movement of shaft 10. The backward movement of shaft 10 within the ball disc integrator 7 results in clockwise rotation of worm gear 12, which causes wheel gear 13, and hence shaft 15, to rotate counter-clockwise which, in turn, causes lever arm 14 to rotate counter-clockwise. This movement of lever arm 14 relieves the pull on cable 45, which changes the reading of the pitch portion of the artificial horizon 42, to indicate a nose down, or diving attitude. The counter-clockwise rotation of lever arm 14 also causes forward movement of shaft 52 which moves lever arm 46 forward and in a counter-clockwise direction about the connecting rod 55. The forward movement of lever arm 46 causes clockwise rotation of lever arm 47 about connecting shaft 49. Clockwise rotation of lever arm 47 causes the altimeter 57 to indicate that the aircraft is descending, through the medium of connecting rod 53, ball disc integrator 54, slip clutch 58 and the arrangement of shaft 59 having threads 60 thereon, the stop member 61 and the track 62. The rate of climb indicator 50 indicates the rate of descent, through the medium of connecting rod 49; gear box 43 and the connecting rod 49.

Slip clutch 16 will permit wheel gear 13 and shaft 15 to continue to rotate if lever bar 14 reaches either stop member 41 or stop member 40 limiting further travel.

The counter-clockwise rotation of lever bar 14 further moves connecting rod 19 forward, causing lever bar 18 to pivot clockwise about pivot support 118, which movement rotates lever bar 21 in a clockwise direction about the end of connecting rod 22. The connecting rod 23 is thereby moved forward and this movement of connecting rod 23 moves lever bar 24 in a clockwise direction, about the anchor 115. Lever bar 24 positions lever bar 26 forward and in a counter-clockwise direction about the end of connector rod 34. Lever bar 26 moves forward, which movement causes the output of ball disc integrator 28 to turn worm gear 31 to rotate wheel gear 32 clockwise. Wheel gear 32 in rotating clockwise moves lever bar 33 forward. An increase in airspeed is indicated by the airspeed indicator 39, when wheel gear 32 is rotated to rotate connecting rod 36 coupled to it, which rotation is coupled by gear box 112 to the connecting rod 38 to rotate it in a clockwise direction. Lever bar 33, in moving forward, causes lever bar 4 to rotate clockwise about the end of connecting rod 5, to thereby readjust the ball disc integrator 7, so that the airspeed indicator is not operated to show a continuing increase in airspeed.

The above described changes in the attitude of an actual aircraft when its control stick is moved forward is therefore realistically indicated on the instruments of the trainer.

It may be noted that when the control stick 1 is neutralized, or returned to center position, the lever bar 4 is repositioned and caused to rotate counter-clockwise about the connecting shaft 6 to counteract the previous clockwise rotation that resulted when the connecting rod 5 was moved backward, due to the forward movement of the control stick 1. Counter-clockwise rotation of lever bar 4 about the end of connecting rod 6 moves connecting rod 10 forward and this movement adjusts ball disc integrator 7, and thereby causes shaft 125 and worm gear 12 to reposition lever bar 14 in the opposite direction. The pitch portion of the artificial horizon 42 is thereby caused to indicate a change in the opposite direction. Also, lever bars 18, 21, 24 and 26 are moved to again change the position of lever bar 33 through the ball disc integrator 28. Connecting rod 34 which connects lever bar 33 and lever bar 26 again readjusts the ball disc integrator 28, to establish a dampening, or oscillating, action within the system which operates to influence the pitch portion of the artificial horizon 42 and the altimeter 57 to move up and down, and the airspeed indicator 39 to increase and decrease until gradually settling to a stable position. When lever bar 26 moves clockwise about the end of connecting shaft 37, shaft 27 is moved forward to reposition the ball portion of the ball disc integrator 28 to one side of the disc thereby causing an output to the roller within the ball disc integrator 28 and to the worm gear 31. Worm gear 31 will rotate wheel gear 32 to move lever bar 33 backward which will, in turn, rotate lever bar 26 counter-clockwise, returning the ball portion of the ball disc integrator 28 to the center of the disc cancelling out any other movement to the roller within the ball disc integrator and, therefore, to the worm gear 31. Lever bar 33, will, therefore, stop rotation and remain fixed until further positioned by the ball disc integrator 28 through worm gear 31. This results in an exponentially-damped oscillation. The output, lever bar 33, represents airspeed which increases at a decreasing rate. The foregoing comprises a phugoid oscillation generator which realistically simulates the actual flight characteristics of an aircraft, so that the trainer has the same controlability as the actual airplane itself. The phugoid oscillation generator may be better understood by referring to FIGS. 6, 7 and 8 which illustrate the inherent oscillatory action of an aircraft in flight, a block diagram representation of a phugoid oscillation generator 149 and the components in FIG. 2 which correspond to, or make up, the phugoid oscillation generator, respectively.

In FIG. 7, the inputs 154 and 155 are two controlled inputs to mechanical linkage computers 156 and 158, respectively. The resultant of the computers 156 and 158 is coupled to another mechanical linkage computer 159 and its output is coupled to a ball disc integrator 160. An output of the ball disc integrator 160 is coupled back to the computer 158 and to the computer 159. The resultant of the computer 158 is coupled to a ball disc integrator 161, and its output is coupled back to the computer 156. The inputs 162 and 163 of the ball disc integrators are both driven at a constant speed, by motor means (not shown).

In FIG. 6 is shown the desired resultant of a momentary displacement and return of either input 154 or 155 of FIG. 7. It may be noted that the curve a of FIG. 6 corresponds to the phugoid curve, of an actual aircraft in flight and indicates the aircraft's inherent stability to recover and return to a level flight attitude, after a momentary displacement of its elevator, or its throttle. The resultant curve a will oscillate and stabilize about the reference z, which reference is determined, or established, by the positions of inputs 154 and 155.

The operation of the phugoid oscillation generator is as follows. Assume that input 155 remains fixed and that the position of input 154 is moved forward. The movement of input 154 to computer 156 is translated by it and the resultant is coupled to computer 159. Input 165 to computer 156 is stationary at this time. Computer 159 likewise translates the inputs to it and the resultant is coupled to the ball disc integrator 160 to position its carriage 167 along its disc 168. Rotation of disc 168 causes roller 169 to rotate when the carriage 167 is displaced from the center position of disc 168.

The rotation of roller 169 of ball disc integrator 160 is such that its input 170 to the mechanical computer 159 will cause the output 171 to the integrator 160 to return carriage 167 in integrator 160 to the center position of disc 168, thereby causing no additional transfer of movement from rotating disc 168 to roller 169 of integrator 160.

The output of roller 169 of integrator 160 also serves as an input 172 to mechanical computer 158. The resultant of input 172 and input 155, which is fixed, to computer 158 is coupled to the ball disc integrator 161 and displaces its carriage 173 from the center of its disc 174 so that the rotation of the disc 174 is transferred to roller 175. Displacement of roller 175, due to rotation, is coupled to and constitutes input 165 to the mechanical computer 156, and the resultant of inputs 154 and 165 to computer 156 is again coupled as an input to the mechanical computer 159.

At this time, input 154 is constant and the input 165 is translated and fed by computer 159 to reposition carriage 167 of integrator 160 along its disc 168, opposite in direction to the previous movement of carriage 167. Roller 169 is therefore caused to rotate in the opposite direction and its output 170 is coupled to computer 159 which, at its output 171, repositions carriage 167 to the center of disc 168 so that no further transfer of rotation occurs.

The output 172 of roller 169 is also again coupled to computer 158 which translates its inputs and couples the resultant to integrator 161 to position its rack 173. Rotation of the disc 174 is transferred to roller 175, through carriage 173, and the output of the roller 175 is again coupled to computer 156, as input 165. At this time, the input 165 is in a direction opposite to what it was previously. The output of computer 156 is again coupled to the computer 159 and the operation is repeated. On each successive operation, the oscillations decreased exponentially in amplitude, as shown in FIG. 6.

It may be noted that positioning of the input 154 and/or input 155 merely adjusts the position, or level, of the reference axis z, shown in FIG. 6, and in all other respects, the operation is substantially as descirbed above.

In FIG. 7, the input 154 represents movement of the throttle of an aircraft and the input 155 represents movement fore and aft of the control stick. The inputs 165 and 172 represent an aircraft's pitch and airspeed, respectively.

Referring now to FIG. 8, the components of FIG. 2 which corresopnd to the components of the phugoid oscillation generator 149, as shown in FIG. 7, are shown. The corresponding components are positioned the same as in FIG. 2 so that they are easily compared. In FIG. 8, the throttle arm 22 corresopnds to the input 154 and the lever arms 18 and 21 make up the mechanical computer 156. The mechanical computer 159 is made up of the lever arms 24 and 26, while the mechanical computer 158 is made up of the lever arms 4 and 33. The input 155 to mechanical computer 158 corresponds to connecting rod 5. Ball disc integrators 160 and 161 correspond to the integrators 28 and 7, respectively. The input from mechanical computer 156 to mechanical computer 159 corresponds to the connecting rod 23 and the input 171 to the ball disc integrator 160, to move its carriage 167, corresopnds to connecting rod 27. The input 172 to mechanical computer 158 corresponds to the worm gear 31 and the gear wheel 32, and the output of mechanical computer 158 and input to ball disc integrator 161, to move its carriage 173, corresponds to connecting rod 10. The worm gear 12, the wheel gear 13, the shaft 15, the slip clutch 16, the lever arm 14 and the connecting rod 19 all go to make up the output from the ball disc integrator 161 to the mechanical computer 156.

Relating the above described phugoid oscillation to the components in FIG. 8, it may be seen that movement of input 154 or throttle 20, results in a repositioning of the lever arms 21 and 18 comprising the mechanical computer 156. The resultant of the lever arms 21 and 18, or computer 156, is coupled by means of the connecting rod 23 to the lever arms 24 and 26 comprising the mechanical computer 159. The resultant of lever arms 24 and 26, or computer 159, is coupled to the ball disc integrator 26, or integrator 160 of FIG. 7, and its output is coupled by means of the worm gear 31 and wheel gear 32 which represent output 172 to the lever arms 4 and 33 representing the mechanical computer 158.

The input to computer 156 comprising lever arms 4 and 33 which represent the stick 1 of the trainer is held constant at this time, as in the above described operation, and the output of computer 156 is coupled by means of connecting rod 10 to the ball disc integrator 7, or integrator 161 of FIG. 7, to displace its components, as described above. The worm gear 12, the wheel gear 13, the slip clutch 16, the lever arm 14 and the connecting rod 19 represent the output of the integrator 161 which is coupled back to the computer 156, to reposition the lever arms 21 and 18. The output of computer 156 is again coupled to the lever arms 24 and 26 comprising the computer 159, and the above described operation is repeated, to provide an exponential decrease in the oscillations of the instruments of the trainer which are controlled by the various ones of the components illustrated.

It may be noted that as in the case of the generator shown in FIGS. 7 and 8, displacement of the input 165 which corresponds to the control stick 1 of the trainer merely functions to adjust the position, or level, of the reference axis, as previously described.

To further explain the operation of the phugoid oscilation generator, attention is again directed to FIG. 2 referring particularly to lever arm 24, lever arm 26, and their directly connecting linkages. Operation of this mechanical computer unit can be explained as follows: When the control stick 1 and the rudder pedals 68 and 69 are held fixed and an input is applied to lever arm 24, as through forward movement of connecting rod 23 resulting from forward movement of throttle 20, lever arm 24 rotates clockwise upon anchor 115. Lever arm 26 is free to move laterally forward and to rotate upon connector 37. The only fixed support for this computer unit comprising lever arm 24, connector 37 and lever arm 26 is the anchor 115. As the aforementioned forward movement of connecting rod 23 takes place, lever bar 26 is caused to rotate counter-clockwise about the end of connecting rod 34 and the input shaft 27 to ball disc integrator 28 is caused to move forward, which movement results in rotation of worm gear 31. As worm gear 31 rotates, wheel gear 32 rotates counter-clockwise causing forward movement of lever arm 33. This movement of lever arm 33, in turn, results in the forward movement of connecting arm 34 causes lever bar 26 to rotate clockwise about the end of connecting shaft 37, which movement equalizes the previous movement of lever arm 26, thus moving shaft 27 backward, centering the balls on the disc resulting in the stabilizing of the reading on the airspeed indicator 39.

It may therefore be noted that the above described phugoid oscillation generator realistically simulates the actual flight characteristics of an aircraft so that the trainer has the same controllability as the actual aircraft itself. It may be further noted that the components in FIG. 2 which comprise the phugoid oscillation generator are not limited in application to realistically simulate the flight characteristics of an aircraft, but are applicable in other environments to generate an output which has an amplitude which oscillates and decreases exponentially. The above description is therefore not to be construed as a limitation, but as merely a description of one application.

To further explain the operation of several elements of the invention, attention is directed to the elements controlling the reading of the altimeter 57 including the ball disc integrator 54, slip clutch 58, threaded shaft 60, and track 62. When there is a forward lateral movement in lever arm 47, there is a corresponding forward movement of the shaft 53 into ball disc integrator 54. This results in the rotation of the shaft 126 and the entire clutch 58 and shaft 59 and threaded shaft 60. The stop member 61 which is threaded on the threaded shaft 60 moves laterally and is restrained from rotating by the track 62. The stop member can move in either direction along the threaded portion 60 until it reaches the stop members 63 on the threaded shaft 59. When it reaches the stop members 63, it stops the rotation of the shaft 59 but rotation of the shaft 126 is allowed to continue by means of the slip clutch 58. Thus after reaching a certain point the reading on the altimeter has reached its upper or lower limit.

A somewhat similar type arrangement is used as is shown in FIG. 2 comprising the worm gear 78, wheel gear 79, slip clutch 63, and stop members 83 and 84. As long as there is an input rotating the worm gear 78, wheel gear 79 will continue to rotate. The entire clutch 63 will rotate until the level arm 80 has reached either stop 83 or 84. When the upper part of lever arm 80 engages either one of these stop members, it will no longer rotate but the worm gear 78 and wheel gear 79 can continue to rotate by means of the slip clutch, since after a certain minimum force is applied, the slip clutch allows relative rotation between its two respective parts.

As another example of the operation of the trainer, assuming forward movement of the throttle 20 without movement of the control stick 1 or the rudder pedals 68 and 69, it would be expected that there would be an increase in the airspeed and some gaining in altitude. Also, there would be expected an increase in r.p.m. as indicated by the tachometer. Further, the artificial horizon would show a nose high attitude. After the initial gain in airspeed, the airspeed would tend to stabilize and there would be a continuing increase in altitude. Referring to FIG. 2, it will be seen that these results actually occur as a result of forward movement of the throttle 20.

When throttle 20 is moved forward, lever arm 21 is moved backward and in a clockwise direction, which movement moves lever arm 141 forward and in a clockwise direction, by means of connecting rod 140. Lever arm 141 in rotating clockwise moves connecting rod 142 forward which, in turn, causes tachometer 95 to indicate an increase in r.p.m. The movement of lever arm 21 also moves lever arm 24 in a clockwise direction about anchor 115, by means of connecting rod 23. Lever arm 24 moves lever arm 26 forward and counter-clockwise about the end of connecting rod 34. Lever arm 33 is moved forward through the operation of shaft 27, ball disc integrator 28, worm gear 31 and wheel gear 32, to in turn, move connecting rod 51 so as to rotate lever arm 46 counter-clockwise. Lever arm 47 being coupled to lever arm 46 is caused to rotate counter-clockwise to, in turn, move connecting rod 53 backward to operate the ball disc integrator 54. The output of integrator 54 by means of slip clutch 58, shaft 59, threads 60, stop member 61 and track 62 causes the altimeter 57 to indicate a slight increase in altitude.

An increase in airspeed is indicated when lever arm 24 rotates clockwise to, in turn, cause lever arm 26 to move forward and to rotate counter-clockwise to move connecting rod 27 forward to operate the ball disc integrator 28. The connecting rod 124 and the worm gear 31 are rotated, which rotation causes wheel gear 32 and shaft 36 to rotate in a counter-clockwise direction. The gear box 112 translates this motion to rotate shaft 38 which causes airspeed indicator 39 to indicate an increase in airspeed.

The artificial horizon 42 indicates a slight nose high attitude due to lever arm 4 moving forward. This movement is conveyed through ball disc integrator 7, shaft 125 and worm gear 12 to the wheel gear 13 to cause it to rotate clockwise. Lever arm 14 being coupled to the wheel gear 13 through shaft 15, slip clutch 16 is caused to rotate clockwise to pull cable 45 backward, which action is opposite to that previously described when the control stick 1 is moved forward, so that now a nose high altitude is indicated.

It may be further noted that the movement of lever arm 14 is coupled back to the lever arm 21 by means of the connecting rod 19 and lever arm 18. The phugoid oscillation described above therefore occurs. The rate of climb indicator 50, the horizontal horizon 42 and the altimeter 57 will all indicate a climbing attitude, as would be expected.

If the control stick of an aircraft is moved right or left, it is expected that the aircraft would bank to the left, or right, depending upon the direction in which the control stick is moved. It is also expected that the aircraft would assume a nose down attitude. A slight backward movement of the control stick is generally applied to compensate for the nose drop, to maintain level flight, and when so applied it is found that the airspeed generally decreases slightly as a result of the bank.

While the trainer of the above mentioned co-pending application is designed to indicate only the banked attitude of the aircraft, the trainer of the present invention, as explained more fully hereinafter, indicates each of the above described expected results.

As shown in FIG. 2, when the control stick 1 is moved to the right, the control rod 71 will be rotated with a corresponding movement downward of connecting rod 73. This will cause a counter-clockwise rotation of lever arm 74 and a forward movement of connecting rod 75. Since the rudders 68 and 69 are being held motionless, rudder control connector 85 will not move and will hold the upper end of lever arm 76 motionless thus the forward movement of connecting rod 75 will cause counter-clockwise rotation of lever arm 76. The upper end of lever arm 66 will rotate clockwise on pin 120, resulting in forward movement of rod 77 into ball disc integrator 67 to cause worm gear 78 to rotate and cause wheel gear 79 to rotate in a counter-clockwise direction. The shaft 122 coupled to wheel gear 79 likewise rotates and will cause lever arm 80 and lever arm 81 to rotate in a counter-clockwise direction. The lever arm 80 moves the cable 82 coupled to the bank portion of the artificial horizon 42, to cause a corresponding change in the reading to indicate that the aircraft is banked to the right. Upon counter-clockwise movement of the lever arm 81, there is a backward movement in connecting rod 101. The movement of connecting rod 101 causes lever arm 98 to rotate counter-clockwise, which movement causes lever arm 97 to pivot counter-clockwise about the end of connecting rod 102. Cable 104 is therefore allowed to move forward, to indicate a turn to the right. Lever arm 81 moves lever arm 86 clockwise and connecting rod 93 is moved backward so that the output of the ball disc integrator 87 causes an appropriate change in the heading indicated by the directional gyro 90. Also, the cable 96 is moved backward and causes the turn and bank indicator 94 to indicate a bank to the right.

Figure 9:
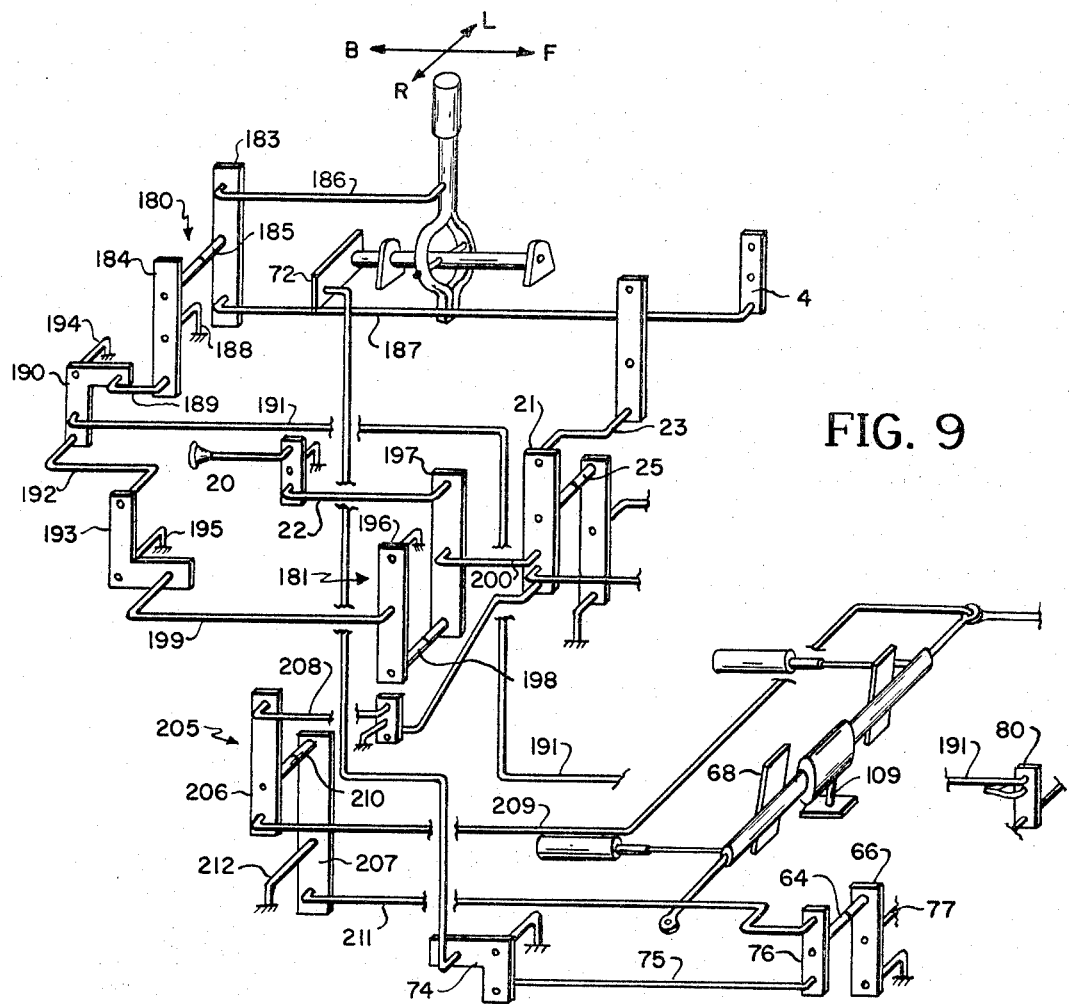
FIGURE 9 is a view illustrating the modifications to be made to the trainer of FIG. 2 to simulate nose drop with bank and also the effect of engine torque.

When an aircraft is banked to the right, or left, the nose of the aircraft generally drops slightly. This action is simulated by modifying the basic trainer of FIG. 2 to add the mechanical computers 180 and 181 and the linkage associated with them, as shown in FIG. 9, and described below. Mechanical computer 18 includes lever bars 183 and 184 which are coupled to one another by means of the shaft 185. A connecting rod 186 connects the top of the lever bar 183 to the control stick 1, above the pivot connection, and a connecting rod 187 connects the bottom of the lever bar 183 to the lever bar 4. The connecting rod 5 is eliminated in this case. The lever bar 184 is pivotally secured to the anchor 188 and the bottom of lever bar 184 is connected by a connecting rod 189 to an L-shaped lever bar 190. A connecting rod 191 connects one of the legs of the L-shaped lever bar 190 to the lever bar 80 and a connecting rod 192 connects the same leg to another L-shaped lever bar 193. The L-shaped lever bars 190 and 193 are anchored by means of the anchors 194 and 195, respectively.

The mechanical computer 181 includes lever bars 196 and 197 coupled to one another by a shaft 198. The lever bar 196 is connected to the other leg of the L-shaped lever bar 193 by means of a connecting rod 199 and lever bar 197 is connected to the lever bar 21 by means of a connecting rod 200.

To illustrate the operation in simulating when an aircraft is banked, assume that the control stick 1 is moved to the right. The lever bar 72 moves the connecting rod 73 downward to cause the lever bar 74 to rotate in a counter-clockwise direction and, in turn, move the connecting rod 75 forward. Lever bar 76 moves forward and in a counter-clockwise direction which action, it may be recalled, will cause the lever bar 80 to rotate counter-clockwise. The connecting rod 191 secured to the lever bar 80 therefore causes the lever bar 190 to rotate clockwise which movement causes the lever bar 184 to rotate in a clockwise direction. This movement causes lever bar 183 to move forward, which movement is the same movement that takes place when the control stick 1 is moved forward to put the aircraft in a diving attitude. From the above description of the operation of the apparatus of FIG. 2 when the control stick 1 is moved forward, it is apparent that the appropriate instruments will indicate the nose down attitude.

The clockwise rotation of the lever bar 190 causes counter-clockwise rotation of the lever bar 193 and this movement causes the connecting rod 199 to be moved backward. Lever bar 196 therefore is rotated clockwise about its anchor and lever bar 197 is rotated clockwise about the throttle connecting rod 22. This movement causes the connecting rod 200 to move backward, to rotate lever bar 21 clockwise about the connecting shaft 25. It may be noted that this rotation is in a direction opposite to that in which the lever bar 21 is rotated when the throttle 20 is advanced. Accordingly then, the appropriate instruments are caused to indicate a decrease in airspeed.

When the control stick 1 is pulled backward to compensate for the nose drop, the lever bar 183 is moved backward, but since the lever bar 184 is held substantially fixed by the anchor 188 and the position of lever arm 190, lever bar 183 is caused to rotate counter-clockwise to move connecting rod 187 forward. This movement of the connecting rod 187 changes the position of the lever arms and associated linkage so as to indicate the change in attitude, and when level flight is indicated, the same pressure is maintained on the control stick to maintain lever flight.

There will be a slight adjustment in the airspeed through the operation of the above described phugoid oscillation generator, however, the airspeed indicator 39 will ultimately indicate a slight decrease in airspeed.

When the throttle of an aircraft is operated to change the airspeed of the aircraft, there is generally some change in the aircraft's attitude. For example, when full throttle is applied, as during take off, the nose of the aircraft will pull to the left, due to the engine's torque. To compensate for this action, right rudder is applied. The basic trainer of FIG. 2 can be modified to realistically simulate this action also.

In FIG. 9, it may be seen that the basic trainer of FIG. 2 is modified by including a still additional mechanical computer 205 having lever bars 206 and 207 and the linkage described below. The lever bar 206 is connected to lever bar 21 by a connecting rod 208 and is connected to the rudder bar 65, to the left of the pivot pin 109, by a connecting rod 209. The lever bar 207 is coupled to the lever bar 206 by a shaft 210 and to the lever bar 76 by a connecting rod 211. Lever bar 207 is also pivotally fixed to the anchor post 212.

The operation may be described as follows. When the throttle 20 is advanced, in this case moved forward, lever bar 197 is caused to rotate counter-clockwise about the end of shaft 198. Connecting rod 200 is moved backward, which movement causes lever bar 21 to rotate clockwise about the connecting rod 25. Connecting rod 23 is moved forward to indicate an increase in airspeed, through the operation of the lever bars and linkage, as described above. Also, lever bar 206 is connected to lever bar 21 and is caused to rotate clockwise about the end of the connecting rod 209, which is held fixed at this time. The clockwise rotation of lever bar 206 rotates lever bar 207 clockwise about the anchor 212. Connecting rod 211 is moved backward which action, in turn, rotates lever bar 76 counter-clockwise about the end of the connecting rod 75. It may be observed that this movement of lever bar 76 is the same movement which occurs when the left rudder 69 of the basic trainer of FIG. 2 is moved forward to cause the rudder bar 65 to pivot about the pivot pin 109, causing backward movement of the connecting rod 85. It would therefore be expected that the tail of the aircraft would swing to the right and hence that the nose of the aircraft would swing to the left, simulating the effect of the engine's torque.

As previously indicated, the effect of torque is compensated for by applying right rudder. In FIG. 9, when right rudder 68 is moved forward, rudder bar 65 pivots counter-clockwise about pivot pin 109 and connecting rod 209 secured to its end is caused to move backward. Backward movement of connecting rod 209 causes lever bar 206 to rotate clockwise about the end of connecting rod 209. Lever bar 207 is caused to rotate counter-clockwise about anchor 212, which movement causes connecting rod 211 to move forward which, in turn, causes lever bar 76 to rotate in a clockwise direction, thereby compensating for the previously simulated effect of engine torque.

From the above description, it can be seen that the effect of engine torque when the throttle is advanced, and the manner in which this torque is compensated for, are both realistically simulated.

The basic trainer of FIG. 2 can also be modified to simulate the decrease in airspeed which occurs in an actual aircraft when the landing gear and flaps are extended. Also, when landing, an aircraft is turned in an established pattern, and these turns are accomplished by banking the aircraft. When the aircraft is banked, the airspeed generally decreases slightly and the nose drops slightly. These characteristics can be simulated individually or simultaneously, by the modifications described below.

Figure 11:
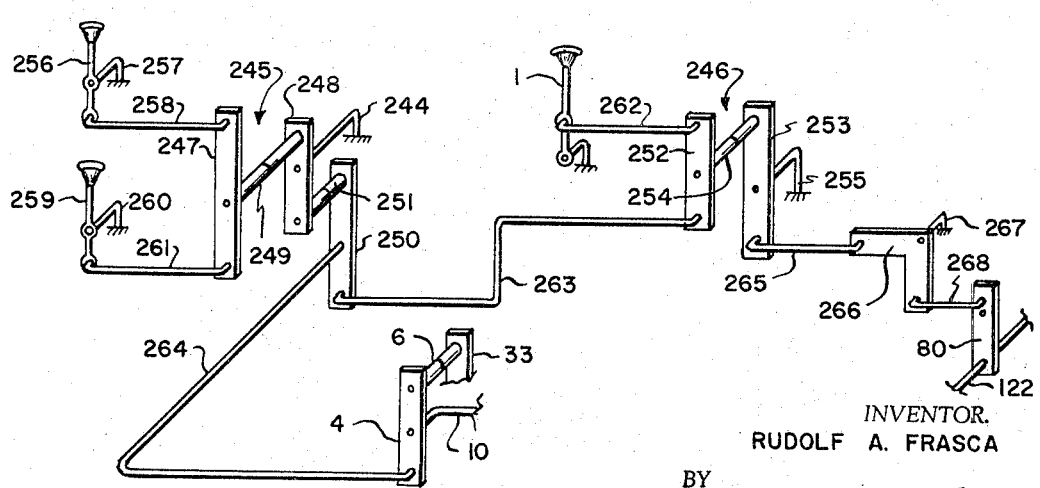
FIGURE 11 is a view illustrating the modifications to be made to the trainer of FIG. 2 to simulate nose drop with bank, and landing gear and flaps.

In FIG. 10, the modifications which are made to the basic trainer of FIG. 2 to simulate the airspeed drop which occurs with bank, landing gear and flaps are shown. In FIG. 11, the modifications which provide nose drop with bank, landing gear and flaps are shown, and in FIG. 12 the modifications for both airspeed drop and nose drop with bank, landing gear and flaps are shown. In FIG. 10, two additional mechanical computers 215 and 216 and their associated linkage are provided and operatively incorporated into the basic trainer of FIG. 2. The mechanical computer 215 includes lever bars 218 and 219 coupled to one another by a shaft 220, and lever bars 221 and 222 coupled to one another by a shaft 223. The lever bars 219 and 221 are also coupled to one another by a shaft 224 journalled within a pillow block 217. A landing gear control stick 225 is pivotally connected at its mid-point to an anchor 226 and its lower end is connected to the upper end of the lever bar 218 by a connecting rod 227. A flaps control stick 228 is likewise pivotally connected at its mid-point to an anchor 229 and its lower end is connected to the lower end of the lever bar 218 by a conecting rod 230. As indicated, moving the landing gear control stick 225 forward simulates putting the landing gear up, and the opposite movement, putting the landing gear down. Moving the flaps control stick 228 backward and forward simulates extending the flaps and retracting the flaps, respectively.

The mechanical computer 216 includes the lever bars 231 and 232 which are coupled to one another by a shaft 233. Lever bar 232 is pivotally secured to an anchor 234 and is connected by a connecting rod 235 to one arm of an L-shaped lever bar 236. The lever arm 231 is connected to the lever bar 222 of mechanical computer 215 by a connecting rod 237. The L-shaped lever bar 236 is pivotally secured to an anchor 238 and its other arm is connected by a connecting rod 239 to the lever bar 80 of the basic trainer. The lever bar 231 is connected by a connecting rod 240 to the lever bar 21 of the basic trainer. The throttle 20 and the connecting rod 22 in this case is connected to a lever bar 241 which is pivotally secured at its mid-point to an anchor 242, and lever bar 241 is connected by a connecting rod 243 to the lever bar 222 of the mechanical computer 215.

The operation of the above described apparatus in simulating airspeed drop with bank, landing gear and flaps may be described as follows. Assume that the flaps are first extended to slow the airspeed of the aircraft. In this case, the flaps control stick 228 is moved backward, hence the connecting rod 230 is moved forward. Since connecting rod 227 is held fixed at this time, lever bars 219 and 221 will be rotated clockwise about connecting shaft 224 and lever bar 222 will be rotated clockwise about the end of connecting rod 243, which is held fixed at this time by the position of throttle 20. This movement causes connecting rod 237 to move forward and, in turn, cause lever bar 231 to rotate clockwise about connecting shaft 233. Lever bar 231 in rotating, causes connecting rod 240 to move forward and hence lever bar 21 of the basic trainer to rotate counter-clockwise about connecting shaft 25. Connecting rod 23 is therefore moved backward, and it may be recalled from the previous description of the operation of the basic trainer, that backward movement of the connecting rod 23 resulted when the throttle 20 was decreased so as to lower airspeed. Since extending the flaps results in a corresponding movement of the connecting rod 23, it follows that a decrease in airspeed is simulated.

When the landing gear is extended, or put down, the landing gear control stick 225 is moved backward, as indicated, which action pushes the connecting rod 227 forward, which movement causes lever bar 218 to rotate clockwise about the end of connecting rod 230. Lever bars 219 and 220 are caused to rotate clockwise on connecting shaft 224 and lever bar 222 is caused to rotate clockwise about the end of connecting rod 243. This movement pushes connecting rod 237 forward, which movement it can be seen corresponds to the previously described movement which simulated a decrease in airspeed when the flaps were extended. A still further decrease in airspeed is now simulated when the landing gear is extended.

When the aircraft is banked, the airspeed generally is decreased, due to aileron drag. It may be recalled that when the control stick 1 of the trainer of FIG. 2 was moved to the right or left to bank the aircraft, the lever bar 80 is caused to rotate on the shaft 122. In FIG. 10, it can be seen that rotation of the lever bar 80 causes the L-shaped lever bar 236 to rotate on its anchor 238. Rotation of lever bar 236 results in a forward movement of the connecting rod 235, regardless of the direction of bank. Lever bar 232 is thereby caused to rotate clockwise about its anchor 234, which movement, in turn, causes lever bar 231 to rotate counter-clockwise about the end of connecting rod 237. Connecting rod 240 is moved forward, which movement it may be recalled resulted in a simulated decrease in airspeed. The resulting decrease in airspeed which occurs when an aircraft is bank is therefore realistically simulated, with the modifications illustrated in FIG. 10.

As indicated above, the nose of the aircraft generally drops slightly with bank, landing gear and flaps. This attitude change should therefore be simulated also. This is accomplished with the additional modifications shown in FIG. 11.

In FIG. 11, two mechanical linkage computers 245 and 246 and their associated linkage are incorporated into the basic trainer of FIG. 2. The mechanical computer 245 has lever bars 247 and 248 coupled to one another by a connecting shaft 249, and a lever bar 250 which is coupled to the lever bar 248 by a connecting shaft 251. Lever bar 248 is pivotally connected to an anchor 244. The mechanical computer 246 has two lever bars 252 and 253 coupled to one another by a connecting shaft 254. The lever bar 254 is pivotally connected to an anchor 255.

A landing gear control stick 256 is pivotally connected to an anchor 257, and has its lower end coupled by a connecting rod 258 to the upper end of the lever bar 247. A flaps control stick 259 is pivotally connected to an anchor 260, and has its lower end coupled by a connecting rod 261 to the lower end of the lever bar 247. Backward movement of both the landing gear control stick 256 and the flaps control stick 259 corresponds to extending the landing gear and the flaps, respectively, as indicated.

A connecting rod 262 is connected to the control stick 1 of the trainer and to the upper end of the lever bar 252 in a fashion such that backward movement thereof pulls the connecting rod 262 backward. The lower end of the lever bar 252 is connected by a connecting rod 263 to the lower end of the lever bar 250, and the lever bar 250 is connected by a connecting rod 264 to the lever bar 4 of the basic trainer of FIG. 2.

The lower end of the lever bar 253 is connected by a connecting bar 265 to one arm of an L-shaped lever bar 266 which is pivotally connected to an anchor 267. The other arm of the L-shaped lever bar 266 is connected by a connecting rod 268 to the lever bar 80 of the basic trainer of FIG. 2.

In operation, when the flaps are extended by moving the flaps control stick 259 backward the connecting rod 261 is moved forward, and lever bar 247 is caused to rotate counter-clockwise about the end of connecting rod 258. Lever bar 248 is caused to rotate clockwise about its anchor 244, which movement causes lever bar 250 to rotate counter-clockwise about the end of connecting rod 263. Connecting rod 264 is moved backward to, in turn cause lever bar 4 to rotate clockwise about the connecting shaft 6. This movement of the lever bar 4 is the same movement that occurs when the control stick 1 is moved forward to place the aircraft in a nose down attitude, hence it is apparent from the previous description that extending the flaps results in a simulation of the resulting nose drop.

When the landing gear is lowered by moving the landing gear control stick 256 backward, connecting rod 258 is moved forward, and lever bar 247 is cause to rotate clockwise about the end of the connecting rod 261. Clockwise rotation of lever bar 247 about the end of connecting rod 261 results in the same movement of the lever bars 248, 250 and 4 as that previously described when the flaps were extended, hence it is apparent that the nose drop which occurs when the landing gear is lowered is realistically simulated.

When the control stick 1 is moved backward to compensate for the resulting nose drop, the connecting rod 262 is moved backward and the lever bar 252 is rotated counter-clockwise about the connecting shaft 254. This movement results in forward movement of connecting rod 263 which, in turn, causes the lever bar 250 to rotate counter-clockwise about connecting shaft 251. Connecting rod 264 is moved forward, causing lever bar 4 to rotate counter-clockwise, thereby compensating for the nose drop which occurred when landing gear and/or flaps were lowered.

When the aircraft is bank, the nose also drops. As explained above, when the control stick 1 is moved to bank the aircraft level bar 80 is caused to rotate on shaft 122. The L-shaped lever bar 266 is caused to rotate, to pull connecting rod 265 forward, regardless of the direction of bank. Lever bar 253 is thereby caused to rotate counter-clockwise about its anchor 255, which movement causes lever bar 252 to rotate clockwise about the end of connecting rod 262. The connecting rod 263 is moved backward to, in turn, cause lever bar 250 to rotate clockwise about the end of connecting shaft 251. This movement moves connecting rod 264 backward, which movement causes lever bar 4 to rotate counter-clockwise about shaft 6. This movement corresponds to movement of lever bar 4 when the control stick 1 is moved forward, hence it is apparent that a nose drop is simulated when the aircraft is banked.

In an aircraft, when the control wheel, or stick, is moved from its center neutral position the ailerons are deflected and the aircraft is caused to bank, either to the right or to the left, depending upon which way the control wheel is rotated. The air, or slipstream, moving over the wings on the aircraft, against the ailerons, tends to center the control wheel, and the pressure required to turn the control wheel from the center position increases as it is turned to extreme positions. The pressure increases substantially exponentially, as a function of airspeed.

Also, when the control wheel, or stick, is moved forward to backward, the elevators are deflected and the aircraft is caused to climb or dive. In this case also, the air, or slip-stream, flowing against the elevators tend to center the control wheel, and pressure is required to maintain the elevators in a deflected position. The pressure required increases substantially exponentially as a function of airspeed, as the control wheel is moved to extreme positions.

With respect to elevator deflection, trim controls are generally provided which are operable to deflect the elevators, or a portion of them, to maintain the aircraft on straight and lever flight, at a fixed altitude. The trim control effectively counteracts the forces acting on the aircraft, to maintain a fixed attitude.

In a trainer, it is highly desirable to simulate the pressure on the control wheel when it is turned to the right or left, or when it is moved forward or backward, so that the trainer has a realistic feel. This pressure is realistically simulated by incorporating the centering control system shown in FIGS. 12 and 13 into the trainer shown in FIG. 2. The centering control system includes an upright frame 300 which is pivotally mounted upon a shaft 301 retained by a pair of pillow blocks 302 and 303 secured to the floor of the trainer.

A control wheel 308 is connected to a shaft 309 which has a universal joint 304 and which is passed through the instrument panel 310 of an aircraft. The end of the shaft 309 is rotatably retained within a tubular sleeve 312 formed integrally with the frame 300, at its upper end. A pivot pin 313 is secured to the frame 300, and is engaged within elongated slots 315 (only one shown) formed in a pair of pivotal arms 317 and 318, respectively. The arms 317 and 318 are pivotally secured at their upper ends, by means of a pivot pin 320, to a threaded bearing block 321. The lower ends of the arms 317 and 318 are pivotally coupled to a pivot shaft 323. A piston 324 of a hydraulic cylinder 325 is pivotally secured to the shaft 323, and the lower end of the hydraulic cylinder 325 is pivotally connected to the pivot shaft 301.

A hydraulic cylinder 330 is pivotally connected to a bracket 331 extending from the frame 300, and its piston 332 is pivotally connected to a bracket 334 fixedly secured to the shaft 309. A gear 335 is secured to the end of the shaft 309, and is coupled by a chain 336 to a gear 337 which is rotatably fixed to a support shaft 338 extending from the frame 300. A lever arm 339 is fixedly secured to and rotated with the gear 337. An L-shaped lever arm 340 is pivotally connected to a pivot shaft 305 and its one leg is coupled to the lever arm 339 by means of a connecting rod 341, so as to be pivoted by it as the gear 337 is rotated. The gears 335 and 337, and the chain 336, the lever arm 339, the connecting rod 341 and the lever arm 340, can replace the lever arm 72, the connecting rod 73 and the lever arm 74 of the trainer of FIG. 2, the connecting rod 75 thereof being connected to the other leg of the lever arm 340. Also, a lever arm 342 is fixedly secured to and is pivotal with the frame 300. This lever arm 342 replaces the lower end 3 of the control stick 1 of the trainer of FIG. 2, and connecting rod 5 thereof is connected to the lever arm 342.

It may be observed that with the above described structure, when the control wheel 308 is rotated to the right or left, the bracket 334 is likewise caused to rotate. This movement of the bracket 334 pulls the piston 332 out of the hydraulic cylinder 330, and as the control wheel is turned, the hydraulic cylinder resists its extraction and tries to pull it back in, thereby creating a pressure on the control wheel which simulates the pressure experienced on the control wheel in an actual aircraft. When the control wheel 308 is released, it will be automatically centered, by the action of the piston 332 being retracted into the hydraulic cylinder 330.

Also, when the control wheel 308 is rotated, the gear 335 rotates to, in turn, rotate the gear 337, by means of the chain 336. The connecting rod 341 coupled between the lever arms 339 and 340 moves the lever arm 340, and hence the connecting rod 75, in the manner described above.

When the control wheel 308 is moved forward or backward, the pivot pin 313 bears on the sides of the elongated slots 315 formed in the arms 317 and 318, and they are caused to pivot to pull the piston 324 from the hydraulic cylinder 325. The pressure normally exeprienced on the control wheel of an actual aircraft is therefore realistically simulated.

Also, when the control wheel is moved forward or backward the lever arm 342 is likewise moved, and its movement is transferred by connecting rod 5 to simulate the climbing or diving attitude of the aircraft in the manner described above.

The trim control includes a shaft 344 which has a threaded portion 345 which is threadably received within the threaded bearing block 321. The ends of the threaded portion 345 are rotatably retained within a supporting structure 346 which is fixedly secured to a wall of the trainer. The opposite end of the shaft 344 etxends through the instrument panel 310 and has a knob 345 connected to it, for rotating the shaft 344.

The elevators of an aircraft are generally trimmed by moving the control wheel so as to compensate for the slight climbing or diving attitude of the aircraft, and the trim control adjusted to relieve the pressure which is necessarily exerted on the control wheel to compensate for it. With the trim control for the trainer of the present invention, when the control wheel 308 is moved forward or backward to compensate for the climbing or diving attitude, the arms 317 and 318 are pivoted, as described above, and the piston 324 is pulled from the hydraulic cylinder 325. A pressure is therefore exerted on the control wheel 308. To relieve this pressure, the knob 345 is rotated, which action is effective to move the threaded bearing block 321 forward, or backward. Moving the bearing block 321 will relieve the established angle between the hydraulic cylinder 325 and the arms 317 and 318 so that the piston 324 is moved, or pulled, back into the hydraulic cylinder. It is apparent that when the piston 324 is within the hydraulic cylinder 325, there will be no pressure exerted on the control wheel so that none is required to compensate for it. The effect of trimming an actual aircraft is therefore realistically simulated in the trainer.

Figures 12, 13:
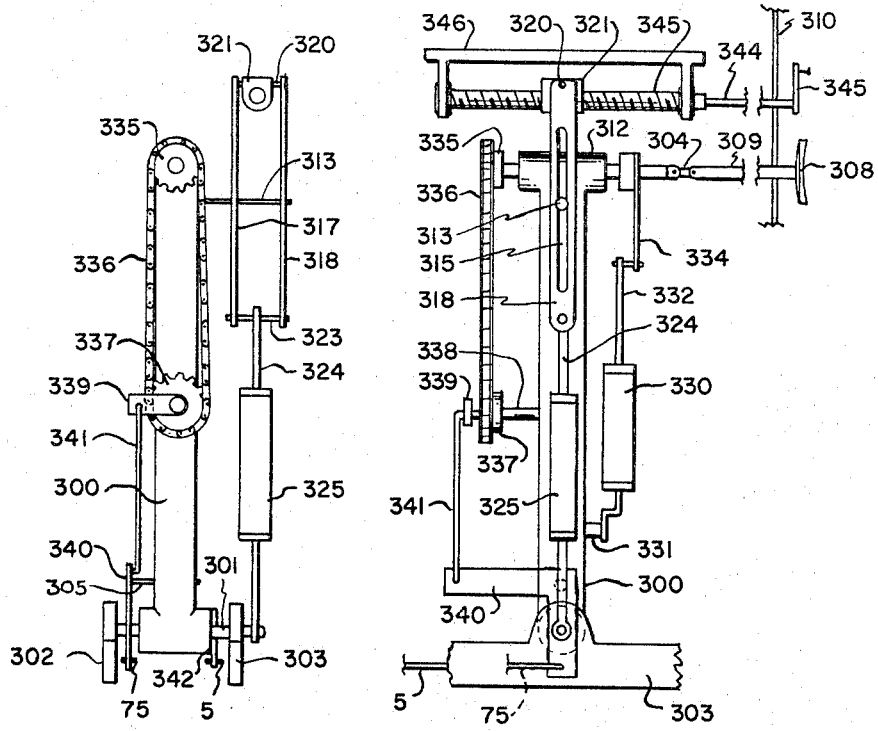
FIGURES 12 and 13 are views illustrating a centering and trim system exemplary of the present invention.
Figure 14:
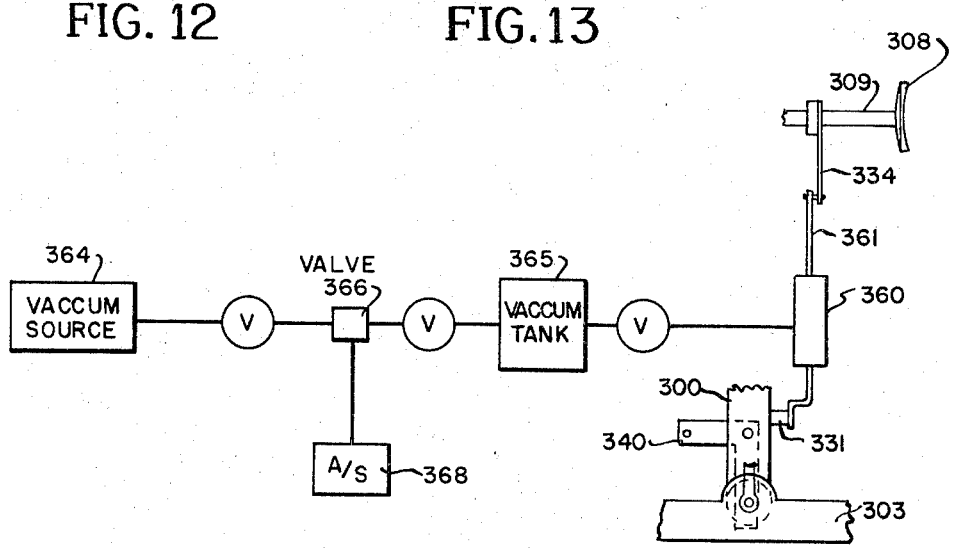
FIGURE 14 is a block diagram illustrating the centering and trim system of FIGS. 12 and 13 modified to function in accordance with airspeed.

In FIG. 14 there is illustrated one manner in which the center and trim system shown in FIGS. 12 and 13 can be modified so as to make the pressure exerted on the elevators by the slipstream flowing over the elevators a function of the airspeed of the aircraft. In FIG. 14, the hydraulic cylinder 330 is replaced with a vacuum cylinder 360 having a piston 361. The vacuum cylinder 360 is fixedly secured to the support bracket 331, and its piston 361 is fixedly secured in a rotatable manner to the lever arm 334 secured to the shaft 309. A vacuum source 364 is coupled to a vacuum tank 365 by means of a valve 366 which is controlled, by means of an airspeed control means 368 coupled to it. Airspeed control means 368 controls the vacuum created within the vacuum cylinder 360 and may be, for example, a direct shaft which is coupled to and positioned by the rotation of the connecting rod 38 of the trainer of FIG. 2, to mechanically control the valve 366 in accordance with the airspeed of the aircraft. In operation, as the airspeed of the aircraft is increased, the valve 366 is operated so as to create a greater vacuum within the vacuum cylinder 360 so that it requires a greater effort to extract its piston 361 from it. By properly adjusting the control exercise by the airspeed control means 368, the valve 366 and the vacuum cylinder 360, the effect of an increase or decrease in the aircraft's airspeed, on the pressure required to be exerted on the control wheel 308 to place the aircraft in a climbing or diving attitude, can be realistically simulated.

In FIG. 15 there is illustrated a rudder centering and trim system for realistically simulating the effect of the air, or slipstream, on the rudder. In FIG. 15, the rudder pedals 68 and 69 of the trainer of FIG. 2 are fixedly secured to a cable 370 which extends about 4 pulleys 71–74 and has its opposite ends fixedly secured to a shaft 376. A shaft 377 having a threaded end portion 378 is rotatably secured within a pair of pillow blocks 379 and 380 which are fixedly secured to the floor of the trainer. A knob 381 is fixedly secured to one end of the shaft 377, for rotating it.

A threaded bearing 384 is positioned on the threaded portion 378 of the shaft 377 and has one end of an elongated arm 385 pivotally secured to it. The opposite end of the arm 385 has a piston 386 of a hydraulic cylinder 387 pivotally secured to it. The hydraulic cylinder 387 is pivotally secured to a supporting shaft 388 which is fixedly secured to the trainer. An elongated slot 390 is formed centrally of the arm 385, and the shaft 376 has a pin 391 which extends through the slot 390. A pair of collars 392 and 393 are positioned on the shaft 376, on opposite sides of the arm 385, and function as stops. Apertured guides 382 and 383 retain the shaft 376 in alignment.

When the rudder pedal 68, or 69, is operated the cable 370 is pulled about the pulleys 71–74 to move the shaft 376 transversely to the arm 385, either to the right or to the left (as shown) depending on which of the rudder pedals is operated. As the shaft 376 is moved transversely to the arm 385, the pin 391 engages the edges of the elongated slot 390 and causes the arm 385 to pivot at the threaded bearing 384. As the arm 385 is caused to pivot, the piston 386 of the hydraulic cylinder 387 is pulled from the hydraulic cylinder, so that pressure must be maintained on the rudder pedal 68 or 69, to maintain it in its operated position. The pressure required to be exerted on the rudder pedal 68 or 69, simulates the effect of the slipstream on the rudder, experienced in an actual aircraft, hence the effect of the slipstream on the rudder is realistically simulated in the trainer.

In an actual aircraft, when the rudder pedals are released, the rudder will return to its center, neutral position. The same results occur with the centering system illustrated in FIG. 15. It may be noted that when the rudder pedals are released, the piston 386 will be drawn back into the hydraulic cylinder 387, which action will be effective to readjust the position of the shaft 376 and hence the cable 370 to its static position.

Many modern day aircraft have rudder trim systems for maintaining the rudder in a deflected position, which trim system is analogous to the elevator trim system described above for maintaining the aircraft in a level flight attitude. With the rudder trim system of FIG. 15, the rudder pedals are operated to determine the rudder pressure required to maintain the aircraft on an established heading, and the trim system adjusted to compensate for the pressure required. This is simulated by the effect of the hydraulic cylinder 387 when the arm 385 is pivoted from its center position by the transverse movement of the shaft 376. As in the above described elevator trim system, the pressure is compensated for, or neutralized, by rotating the shaft 377 to position the threaded bearing 384 along its threaded portion 378 until the pressure exerted by the hydraulic cylinder 387 is relieved.

In many larger aircraft, the elevator and rudder trim systems are electrically operated. The elevator and rudder trim systems in the trainer of the present invention can also be electrically operated by, as illustrated in FIG. 15, fixedly securing a gear 395 to the end of the shaft 377 in place of the knob 381. An electric motor 396 having a gear 397 secured to its output shaft 398 is fixedly positioned so that the gear 397 is drivingly engaged with the gear 395. A control switch 399 is provided on the instrument panel of the trainer for operating the electric motor 396. By operating the electric motor to rotate the shaft 377, the threaded bearing 384 can be positioned on the threaded portion 378 of the shaft 377 to trim the aircraft, in the manner described above. A similar arrangement could likewise be coupled to the end of the shaft 344 of the elevator trim system shown in FIGS. 12 and 13.

Whenever the ailerons of an actual aircraft are deflected from their center positions, the nose of the aircraft tends to swing in the opposite direction because of aileron drag. This is generally referred to as adverse yaw. In order to perform a coordinated turn, the rudder must be used to bring the tail of the aircraft around to the proper direction of the turn. Unless an aircraft has automatic interconnected controls, that is, interconnected aileron and rudder controls, a coordinated turn to the right, would require right aileron and the proper amount of right rudder. Correspondingly, a coordinated turn to the left would require left aileron the proper amount of left rudder. When rolling out of a right turn, that is, returning the aircraft to straight and level flight, left aileron and left rudder would require coordination.

Figure 18:
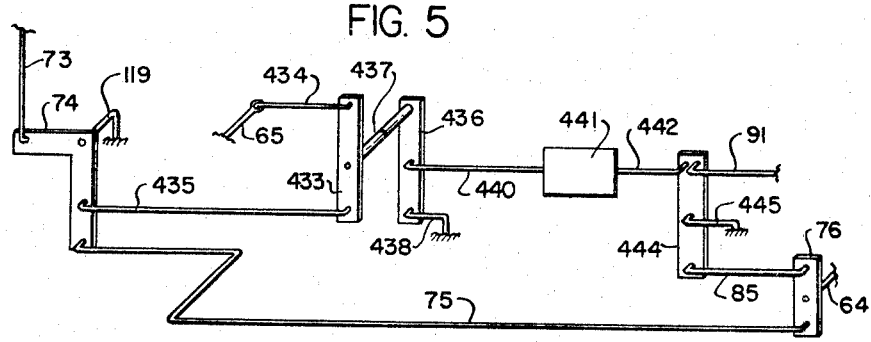
FIGURE 18 is a view illustrating the components incorporated into the trainer of FIG. 2 to simulate adverse yaw.

The above described adverse yaw experienced in an actual aircraft can be simulated in the trainer of FIG. 2, by incorporating the modification shown in FIG. 18. In this figure, it may be noted that the lever bar 74 has a connecting rod 435 which is connected to the lower end of a lever arm 433. Also, the left end of the rudder bar 65 is connected by means of a connecting rod 434 to the upper end of the lever arm 433, rather than to the connecting rod 91 of FIG. 2 which, in this case, is connected to the upper end of a lever bar 444. The connecting rod 85 is connected to the lower end of the connecting bar 444.

A lever arm 436 is coupled to the lever arm 433 at its upper end by means of a connecting shaft 437. The lower end of the lever arm 436 is pivotally secured to an anchor 438. A connecting rod 440 is coupled to the lever arm 436 and to a lag system 441 which is adapted to provide a momentarily delayed output in the same direction to a connecting rod 442 which is connected to the upper end of the lever arm 444. The lever arm 444 is pivotally secured at its mid-point to an anchor 445. The connecting rods 91 and 85 of FIG. 2, as indicated above, are connected to the upper and lower ends, respectively, of the lever arm 444.

In operation, coordinated left rudder and left aileron, which would result in movement of the connecting rods 75 and 434, will result in no movement of the connecting rod 440 since the connecting rod 434 will be moved forward and the connecting rod 75 will be moved backward so that the lever arm 433 merely pivots about the shaft 437. The banked attitude of the aircraft will be simulated through the resulting movement of the connecting rod 75, precisely in the same manner as described above.

If no rudder is applied when the left aileron is deflected, by moving the control stick 1 to the left, the connecting rod 440 will be pulled backwards by the action of the lever arms 433 and 436. This is as follows: when the control stick 1 is moved to the left, the connecting rod 73 is moved upwardly, thereby causing the lever arm 74 to pivot clockwise about the anchor 119. The connecting rod 435 is pulled backward, causing the lever arm 433 to pivot clockwise about the end of the connecting rod 434 which is held fixed at this time. Lever arm 436 is thereby caused to rotate counter-clockwise about the anchor 438, which movement causes the connecting rod 440 to be moved backward. The input from the connecting rod 440 to the lag system 441 is delayed momentarily and the connecting rod 442 is thereafter caused to move backward. The backward movement of the connecting rod 442 causes the lever arm 444 to rotate counter-clockwise about the anchor 445. This movement of the lever arm 444 causes the connecting rod 91 to be moved backward, which movement will through lever arm 86 and cable 96, cause the needle in the turn and bank instrument 94 to move to the right and will through the connecting rod 102, lever arm 97 and cable 104 will cause the ball of the turn and bank indicator 94 to move to the left. It will be observed that the needle and the ball of the turn and bank indicator 94 will be oppositely directed if the right aileron is deflected with no rudder deflection.

It will also be observed that rudder deflection with no aileron deflection will result in a movement of the needle in the same direction corresponding to the particular rudder which is operated, and movement of the ball in the opposite direction.

Many modern day aircraft have a variable pitch propeller which functions in conjunction with a manifold pressure system to maintain constant airspeed. Generally, as long as the manifold pressure is maintained at or above a predetermined value, a governor within the system will change the pitch of the propeller to maintain a constant r.p.m.

Assuming for the purpose of explanation that the aforesaid established valve is 15 inches of manifold pressure, if the throttle is brought below this value the r.p.m., as indicated by the tachometer, will drop accordingly and in proportion to the position of the throttle. If the throttle is brought back all he way, the r.p.m. will normally drop to approximately 1000 r.p.m.

If the throttle is maintained at or above the 15 inches of manifold pressure, the r.p.m. can be varied by varying the pitch of the propeller, by means of a propeller pitch control. With the propeller pitch control at a maximum in one or the other of two directions, the r.p.m. will be at a maximum and a minimum, for a particular throttle setting. For example, for a particular throttle setting, with the propeller pitch control at its maximum r.p.m. position, the tachometer may indicate 2600 r.p.m. With the same throttle setting and the propeller pitch control at its minimum r.p.m. position, the tachometer may indicate 1600 r.p.m.

The above described function can be simulated in the trainer of the present invention by incorporating the components shown in FIG. 16. The throttle 20 is connected to the upper end of a lever bar 400 which is pivotal about an anchor 401. The lower end of the lever bar 400 is connected by means of a connecting rod 403 to the upper end of a lever arm 404 which is connected to and functions to rotate a shaft 406 of potentiometer 405 which is electrically coupled to and controls the indication of a manifold pressure gauge 408 that is incorporated into the control panel of the trainer.

A connecting rod 410 is connected to the upper end of the lever arm 404 and slidably received within a collar 411 which is fixedly secured by a shaft 412 to the upper end of a lever arm 414. The lower end of the lever arm 414 is connected to and functions to rotate a shaft 416 of a potentiometer 415 which is electrically coupled to and functions as an input to a potentiometer 418. The lever arm 414 is urged against a stop 420, by means of a spring 421 or the like. Another collar 423 is fixedly secured to the connecting rod 410 and represents the established manifold pressure.

A propeller pitch control 424 is connected by a connecting rod 425 to one end of a lever arm 427 which is coupled to and functions to rotate a shaft 428 of the potentiometer 418.

The electrical coupling between the potentiometers 405, 415 and 418 is shown in FIG. 17.

In operation, when the throttle 20 is advanced the lever arm 400 is caused to rotate clockwise about the anchor 401, which action pulls the connecting rod 403 backward. This movement of the connecting rod 403 causes the lever arm 404, and hence the shaft 406 of potentiometer 405, to rotate counter-clockwise. The resulting electrical output of potentiometer 405 establishes an indication on the manifold pressure gauge 408. As long as the throttle 20 is advanced sufficiently so that the established manifold pressure is at or above the established value, say 15 inches, the r.p.m. can be varied by adjustably positioning the propeller pitch control 424. The propeller pitch control 424, on being moved to the left (as shown), causes the lever arm 427 and hence shaft 428 of potentiometer 418 to rotate clockwise. The electrical output of potentiometer 418 establishes an indication on the tachometer 430. Once the r.p.m. is established, it will normally be maintained constant by the governor (not shown) in an actual aircraft. In the trainer of the present invention the r.p.m. will remain constant so that the governor need not be included.

If the throttle 20 is backed off, or decreased, below the established manifold pressure, by moving the throttle 20 to the left (as shown) the lever arm 400 is caused to rotate counter-clockwise. This movement causes the lever arm 404 and hence the shaft 406 of potentiometer 405 to rotate clockwise. The decrease in throttle is indicated on the manifold pressure gauge 408.

The clockwise rotation of the lever arm 404 also causes forward movement of the connecting rod 410. If the manifold pressure is decreased below the established value, determined by the position of the coupler 423 on the connecting rod 410, the coupler 423 will engage the coupler 411 and cause the lever arm 414 and hence the shaft 416 of potentiometer 415 to rotate clockwise. The output of the potentiometer 415 adjusts the input to the potentiometer 418, and hence the tachometer 430, which will indicate a decrease in r.p.m.

When the throttle 20 is again advanced from an indication below the established value to a greater indication, the collar 423 will be disengaged from the collar 411, to allow the lever arm 414 to rotate counter-clockwise until it again bears against the stop 420. As long as the lever bar 414 bears against the stop 420, the r.p.m. will remain constant.

From the above description, it can be seen that the operation of a manifold pressure system and a variable pitch propeller is realistically simulated in the trainer of the present invention.

It will thus be seen that the object set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. An aviation trainer comprising a control stick or wheel which is fixedly secured to a shaft and which is movable to simulate the movement required to position an aircraft's elevators, and a centering system for applying a pressure which tends to return said control stick or wheel to its neutral position to realistically simulate the effect of air slipstream on an aircraft's elevators when deflected, said centering system comprising a frame member which is pivotally mounted at its one end to said trainer and which has said shaft secured to its opposite end, arm means having an elongated slot formed therein and pivotally fixed at one end to said trainer, pin means fixedly secured to said frame and engaged within said elongate slot, a hyraulic cylinder fixedly and pivotally secured to said trainer and having a piston fixedly and pivotally secured to the opposite end of said arm means, said control stick or wheel upon being moved forward or backward causing said frame to pivot and move said pin means within said elongated slot, the movement of said pin means causing said arm means to pivot, whereby said piston is pulled from said hydraulic cylinder to thereby exert a force on said arm means to resist said pivotal movement thereof, said force being transmitted to said frame and to said shaft.

2. An aviation trainer comprising a control stick or wheel which is fixedly secured to a shaft and which is movable to simulate the movement required to position an aircraft's ailerons, and a centering system for applying a pressure which tends to return said control stick or wheel to its neutral position to realistically simulate the effect of air slipstream on an aircraft's ailerons when deflected, said centering system comprising a vacuum cylinder which is fixedly and pivotally secured to said trainer and having a piston which is fixedly and pivotally secured to said shaft, a vacuum source, a vacuum tank connected to said vacuum cylinder, a valve connected between said vacuum source and said vacuum tank which is operated in accordance with the simulated airspeed of an aircraft to control the vacuum supplied to said vacuum tank and to said vacuum cylinder, whereby movement of said control stick or wheel pulls said piston from said vacuum cylinder to thereby exert a force on said shaft in accordance with the simulated airspeed of an aircraft resisting said movement of said control stick or wheel.

3. An aviation trainer comprising a control stick or wheel which is fixedly secured to a shaft and which is movable to simulate the movement required to position an aircraft's elevators and a centering system for applying a pressure which tends to return said control stick or wheel to its neutral position to realistically simulate the effect of air slipstream on an aircraft's elevators when deflected, said centering system comprising a frame member which is pivotally mounted at its one end to said trainer and which has said shaft secured to its opposite end, arm means having an elongated slot formed therein and pivotally fixed at one end to said trainer, pin means fixedly secured to said frame and engaged within said elongate slot, a vacuum cylinder fixedly and pivotally secured to said trainer and having a piston fixedly and pivotally secured to the opposite end of said arm means, a vacuum source, a vacuum tank connected to said vacuum cylinder, a valve connected between said vacuum source and said vacuum tank which is operated in accordance with the simulated airspeed of an aircraft to control the vacuum supplied to said vacuum tank and to said vacuum cylinder, said control stick or wheel upon being moved forward or backward causing said frame to pivot and move said pin means within said elongated slot, the movement of said pin means causing said arm means to pivot, whereby said piston is pulled from said vacuum cylinder to thereby exert a force in accordance with the simulated airspeed of an aircraft on said arm means to resist said pivotal movement thereof, said force being transmitted to said frame and to said shaft.

4. An aviation trainer comprising a control stick or wheel which is fixedly secured to a shaft and which is movable to simulate the movement required to position an aircraft's elevators, and a centering and trim system for realistically simulating the movement of the control stick or wheel required to neutralize the effect of air slipstream on a aircraft's elevators to maintain the aircraft in level flight, said centering and trim system comprising a frame member which is pivotally mounted at its one end to said trainer and which has said shaft secured to its opposite end, arm means having an elongated slot formed therein, a threaded shaft which is rotatably retained within a pillow block fixedly secured to said trainer, a threaded bearing secured to said threaded shaft and movable thereon when said threaded shaft is rotated, a hydraulic cylinder fixedly and pivotally secured to said trainer and having a piston fixedly and pivotally secured to one end of sai arm means, the opposite end of said arm means being pivotally and fixedly secured to said threaded bearing, said control stick or wheel upon being moved forward or backward causing said frame to pivot and move said pin means within said elongated slot, a movement of said pin means causing said arm means to pivot, whereby said piston is pulled from said hydraulic cylinder to thereby exert a force on said arm means to resist said pivotal movement thereof, said force being transmitted to said frame and to said shaft, said threaded shaft being rotated to reposition the one end of said arm means which is pivotally secured to said threaded bearing so as to neutralize said force exerted on said arm means.

5. An aviation trainer comprising rudder pedals which are movable to simulate the movement required to position an aircraft's rudder, and a centering system for applying a pressure which tends to return said rudder pedals to their neutral positions to realistically simulate the effect of air slipstream on an aircraft's rudder when deflected, said centering system comprising arm means having an elongated slot formed therein and having one end pivotally and fixedly secured to said trainer, a hydraulic cylinder which is fixedly and pivotally secured to said trainer and having a piston which is pivotally an fixedly secured to the opposite end of said arm means, a shaft mounted transversely to said arm means and having a pin fixedly secured thereto and engaged within said elongated slot in said arm means, a cable having its ends fixedly secured to the opposite ends of said shaft, said rudder pedals being fixedly secured to said cable and said cable being adapted to move said shaft transversely to said arm means upon operation of said rudders, said transverse movement of said shaft causing said pin means to move within said elongated slot to cause said arm means to pivot and to pull said piston from said hydraulic cylinder, to thereby exert a force on said arm means which resist said pivotal movement thereof and tends to restore said rudders to their neutral position.

6. An aviation trainer comprising rudders which are movable to simulate the movement required to position an aircraft's rudder, and a centering and trim system for said rudders comprising a threaded shaft rotatably mounted within a pillow block fixedly secured to said trainer, a threaded bearing secured to said threaded shaft and movable thereon upon rotation of said threaded shaft, arm means having an elongated slot formed therein and pivotally secured at its one end to said threaded bearing, a hydraulic cylinder which is fixedly and pivotally secured to said trainer and having a piston which is fixedly and pivotally secured to the opposite end of said arm means, a shaft which is positioned transversely to said arm means and having pin means fixedly secured thereto and engaged with said elongated slot formed in said arm means, a cable having its opposite ends fixedly secured to the ends of said shaft and adapted to move said shaft transversely to said arm means upon operation of said rudders, said rudders being fixedly secured to said cable, the movement of said rudders causing said shaft to move transversely to said arm means and said pin means on being moved within said elongated slot causing said arm means to pivot and to pull said piston from said hydraulic, thereby exerting a force on said arm means resisting said pivotal movement, said threaded shaft upon being rotated repositioning said threaded bearing and the opposite end of said arm means to neutralize said force resisting said pivotal movement of said arm means.

7. An aviation trainer, as claimed in claim 6, further including gear means fixedly secured to the end of said threaded shaft, electric motor means having gear means fixedly secured to its output shaft and drivingly engaged with said gear means fixedly secured to said threaded shaft, and switch means connected to said electric motor means for controlling its operation, whereby said centering and trim system is electrically controlled.

8. An aviation trainer comprising means for simulating the operation of an aircraft which has variable pitch propeller and a manifold pressure system, said means comprising a throttle, a manifold pressure gauge, a first potentiometer electrically coupled to said manifold pressure gauge, mechanical linkage means coupling said throttle to said first potentiometer for controlling its operation in accordance with the position of said throttle, a second potentiometer, stop means, a lever arm coupled to said second potentiometer for controlling its operation and normally biased against said top means, a shaft coupled to and moved by said mechanical linkage means in accordance with the position of said throttle, lever arm moving means fixedly secured to said lever arm and adapted to slidably retain the opposite end of said shaft therein, a collar means secured to said shaft and positioned in accordance with a predetermined manifold pressure, said collar means engaging said lever arm moving means and moving said lever arm to operate said second potentiometer to simulate a decrease in manifold pressure below said predetermined valve, a propeller pitch control, a tachometer indicator, a third potentiometer coupled to and operated by said propeller pitch control, said third potentiometer being coupled to said second potentiometer and to said tachometer indicator and both said second and third potentiometer controlling the indication of said tachometer indicator in accordance with their respective positions.

9. A stationary aviation trainer for the instruction of pilots comprising, in combination: a fuselage; a control stick; a throttle, instruments including an airspeed indicator, altimeter, rate-of-climb indicator and an artificial horizon; a first mechanical computer coupled to said control stick and to said airspeed indicator and responsive to movement of said control stick to operate said airspeed indicator to indicate thereon an assumed simulated airspeed reading; a second mechanical computer coupled to said first mechanical computer and to said altimeter to operate said altimeter to indicate thereon an assumed simulated altitude responsive to the operation of said first mechanical computer; means coupling said rate of climb indicator to said second mechanical computer to operate said rate of climb indicator to indicate thereon an assumed climb or descent reading; and a feed-back loop including a mechanical integrator and a third mechanical computer to an input thereof to operate said first mechanical computer to provide an output to said instrument to cause the readings thereon to oscillate in an exponential decreasing fashion and to stabilize about a reference axis established by the position of the control stick.

10. A stationary trainer, as claimed in claim 9, wherein said throttle is coupled to said third mechanical computer included in said feed-back loop, said throttle upon being moved operating said third mechanical computer to cause said first mechanical computer to adjust the level of said reference axis.

11. A stationary trainer, as claimed in claim 9, wherein said feed-back loop further includes a fourth mechanical computer; means coupling said fourth mechanical computer to said artificial horizon to operate said artificial horizon to indicate thereon a simulated assumed attitude reading.

12. A stationary trainer, as claimed in claim 9, further including a mechanical integrator in the coupling between said first and said second mechanical computers to give a delayed simulated reading on said altimeter.

13. A stationary trainer, as claimed in claim 9, further including rudder controls, coupling means including a fifth, sixth and seventh mechanical computer coupling said control stick to said gyro indicator and said turn and bank indicator and operated in response to the movement of said control stick to indicate thereon simulated assumed compass headings and turn and bank readings, respectively, said rudder controls being coupled to said fifth and seventh mechanical computers for operating them to correct the simulated assumed readings indicated on said gyro and said turn and bank indicators.

14. The stationary trainer of claim 13, further including mechanical integrator means included in said coupling means for providing a delayed simulated reading on said gyro and turn and bank indicators.

15. A stationary aviation trainer for the instruction of pilots comprising, in combination: a fuselage; a control stick; a throttle, instruments including an airspeed indicator, altimeter, rate-of-climb indicator and an artificial horizon; a first mechanical computer coupled to said control stick and to said airspeed indicator and responsive to movement of said control stick to operate said airspeed indicator to indicate thereon an assumed simulated airspeed reading; a second mechanical computer coupled to said first mechanical computer and to said altimeter to operate said altimeter to indicate thereon an assumed simulated altitude responsive to the operation of said first mechanical computer; means coupling said rate-of-climb indicator to said second mechanical computer to operate said rate-of-climb indicator to indicate thereon an assumed climb or descent reading; said first mechanical computer being a part of a phugoid oscillation generator which further includes a second mechanical computer, a first mechanical integrator coupling said first mechanical computer to said second mechanical computer, a second mechanical integrator, a third mechanical computer coupling said second mechanical computer to said second mechanical integrator, said second mechanical integrator being coupled to said first mechanical computer to operate said first mechanical computer to provide an output to said instruments to cause the readings thereon to oscillate in an exponential decreasing fashion and to stabilize about a reference axis established by the position of the control stick.

16. A stationary aviation trainer, as claimed in claim 15, wherein said throttle is coupled to said second mechanical computer and upon being moved operates said second mechanical computer to vary its output to operate said first mechanical computer to adjust the level of said reference axis.

17. In a grounded aviation trainer, a throttle, a control stick, instruments including an airspeed indicator, tachometer, rate-of-climb and an altimeter, means coupling said throttle and said control stick to said instruments including a combination of mechanical means for computing two variables corresponding to the position of said throttle and the simulated pitch of an airplane, means for a delayed response, a connection between said mechanical means and said means for delayed response, the output of said delayed response means corresponding and representing simulated airspeed and being computed with another variable corresponding to the position of said control stick, the resultant controlling the speed and direction of an output of a mechanical integrator, said output of said integrator being limited in travel and corresponding to the simulated pitch of an airplane coupled and as an input to said first mechanical means.

18. In a grounded aviation trainer, a throttle, a control stick, instruments including an airspeed indicator, tachometer, rate-of-climb and an altimeter, means coupling said throttle and said control stick to said instruments including a combination of mechanical means for computing two variables corresponding to the position of said throttle and the simulated pitch of an airplane, the output of said mechanical means serving as an input to a mechanical lag system comprising a mechanical ball disc integrator and a mechanical computer, the output of said mechanical lag system corresponding to and representing simulated airspeed and being computed with an additional variable corresponding to the position of said control stick to vary the speed and directional output of a mechanical integrator whose output is limited by a stop member and a mechanical slip-clutch, the output of said last mentioned integrator corresponding to the simulated pitch of an airplane coupled as one of the inputs to the said first mentioned mechanical means for computing two variables.

19. A stationary aviation trainer for the instruction of pilots including a plurality of instruments, a plurality of control means including a control stick and a throttle, and a phugoid oscillator coupling said control means to said instruments comprising a combination of mechanical means for computing two variable inputs thereto, one of said variable inputs being the output from said throttle, means for a delayed response, an output connection from said mechanical means to said means for a delayed response, the output of said means for a delayed response being computed with another variable which is the output from said control stick, the resultant thereof being coupled to and controlling the speed and direction of an output of mechanical integrator, said output of said mechanical integrator being limited in travel and serving as the other one of said variable inputs to said mechanical means, whereby the readings indicated by said instruments are caused to oscillate in an exponential decreasing fashion and to stabilize about a reference axis established by the position of said control stick.

20. A stationary aviation trainer for instructing the pilots including a plurality of instruments, a plurality of control means including a control stick and a throttle, and a phugoid oscillator coupling said control means to said instruments comprising a combination of mechanical means for computing two variable inputs thereto, one of said vairable inputs being the output from said throttle, the output of said mechanical means being coupled to and serving as an input to a mechanical lag system comprising a mechanical ball disc integrator and a mechanical computer, the output of said mechanical lag system being computed with another variable which is the output from said control stick, the resultant thereof being coupled to and controlling the speed and direction of an output of a mechanical integrator, said output of said mechanical integrator being limited by a stop member and a mechanical slip-clutch and coupled to said first-mentioned mechanical means as the other one of said variable inputs thereto, whereby the readings indicated by said instruments are caused to oscillate in an exponential decreasing fashion and to stabilize about a reference axis established by the position of said control stick.

References Cited

UNITED STATES PATENTS

| | | | |
|---|---|---|---|
| 2,409,238 | 10/1946 | Barber | 35—12 |
| 2,450,239 | 9/1948 | Kail | 34—12 |
| 2,930,143 | 3/1960 | Dehmel | 35—12 |
| 3,007,258 | 11/1961 | Hemstreet et al. | 35—12 |
| 2,099,857 | 11/1937 | Link | 35—12 |
| 2,842,867 | 7/1958 | Dehmel | 35—12 |
| 2,404,294 | 7/1946 | Jordan | 235—61 |
| 2,689,684 | 9/1954 | Laternser | 235—61 |
| 3,198,429 | 8/1965 | Williams | 235—61 |

FOREIGN PATENTS 568,731  1/1933  Germany.

EUGENE R. CAPOZIO, *Primary Examiner.*

R. W. WEIG, S. BENDER, *Assistant Examiners.*